US006266062B1

(12) United States Patent
Rivara

(10) Patent No.: US 6,266,062 B1
(45) Date of Patent: Jul. 24, 2001

(54) LONGEST-EDGE REFINEMENT AND DEREFINEMENT SYSTEM AND METHOD FOR AUTOMATIC MESH GENERATION

(76) Inventor: Maria-Cecilia Rivara, Gabriel D'Annunzio 6970, La Reina Santiago (CL)

( * ) Notice: Subject to any disclaimer, the term of this patent is extended or adjusted under 35 U.S.C. 154(b) by 0 days.

(21) Appl. No.: 09/162,737

(22) Filed: Sep. 29, 1998

Related U.S. Application Data

(60) Provisional application No. 60/061,439, filed on Oct. 8, 1997.

(51) Int. Cl.$^7$ .................................................. G06T 15/00

(52) U.S. Cl. ........................... 345/419; 345/420; 345/423

(58) Field of Search ................................... 345/419, 420, 345/423, 428, 429

(56) References Cited

U.S. PATENT DOCUMENTS

| 5,214,752 | * | 5/1993 | Meshkat et al. ..................... 395/123 |
| 5,440,674 | * | 8/1995 | Park ..................................... 395/123 |
| 5,886,702 | * | 3/1999 | Migdal et al. ........................ 345/423 |
| 6,046,744 | * | 4/2000 | Hoppe ................................. 345/419 |

OTHER PUBLICATIONS

L. Chew, Guaranteed–quality triangular meshes, Dept. of Computer Science, Cornell University, TR 89–983, (1989).
N. A. Golias and T. D. Tsiboukis, An approach to refining three dimensional tetrahedral meshes based on Delaunay transformations, International Journal for Numerical Methods in Engineering, vol. 37, 793–812 (1994).
M. T. Jones and P. E. Plassmann, Computational results for parallel unstructured mesh computations, Computing Systems in Engineering, vol. 5, 297–309 (1994).

R.V. Nambiar, R.S. Valera and K.L. Lawrence, An algorithm for adaptive refinement of triangular element meshes, International Journal of Numerical Methods in Engineering, vol. 36, 499–509 (1993).
Ruppert, A Delaunay refinement algorithm for quality 2–dimensional mesh generation, Journal of Algorithms, vol. 18, 548–585 (1995).
Rebay, Efficient unstructured mesh generation by means of Delaunay triangulation and Bowyer–Watson algorithm, J. Comp. Physics, vol. 106, 125–138 (1993).

(List continued on next page.)

*Primary Examiner*—Mark Zimmerman
*Assistant Examiner*—Enrique L Santiago
(74) *Attorney, Agent, or Firm*—Jay R. Yablon

(57) ABSTRACT

A method, mesh data structure and apparatus is disclosed for producing an improved/refined/derefined mesh of finite elements for a three-dimensional object showing boundaries and faces. The improvement/refinement method repeatedly searching, for consecutive sets of active target elements to be refined or improved, an associated submesh and set of terminal edges, the searching process not modifying the mesh data structure; then according to the point insertion method chosen, selection of the point or the points to be inserted between the midpoints of the terminal edges modified by some boundary considerations; inserting the selected point or points in the initial mesh; and then proceeding to the succeeding set of active target elements until an user-defined stopping criterion is achieved.

The derefinement method, for each target vertex finding an associated set of neighbor vertices to be derefined; then eliminating each said vertex according an appropriate order such that the derefinement of said vertex allows to re-obtain a previous terminal edge whose bisection produced said vertex. The method, mesh data structure and apparatus of this invention allowing the parallel scaleable refinement/derefinement of the mesh by locally modifying sets of neighbor elements sharing the common longest-edge.

52 Claims, 23 Drawing Sheets

OTHER PUBLICATIONS

M. C. Rivara, Algorithms for refining triangular grids suitable for adaptive and multigrid techniques, International Journal for Numerical Methods in Engineering, vol. 20, 745–756 (1984a).

M. C. Rivara, Design and data structure for fully adaptive, multigrid finite element software, ACM Trans. Math. Software, vol. 10, 242–264 (1984b).

M. C. Rivara, A grid generator based on 4–triangles conforming mesh–refinement algorithms for triangulations, International Journal for Numerical Methods in Engineering, vol. 24, 1343–1354 (1987).

M. C. Rivara, Adaptive finite element refinement and fully irregular and conforming triangulations, In Accuracy Estimates and Adaptive Refinements in Finite Element Computations, I. Babuska, O.C. Zienkiewicz, J. Gago and E. R. de A. Oliveira (eds.), John Wiley & Sons, Chichester, pp. 359–370 (1986).

M.C. Rivara and M. Palma, New LEPP–algorithms for quality polygon and volume triangulation: implementation issues and practical behavior. In Trends in Unstructured Mesh Generation, S.A. Canann and S. Saigal (eds.) AMD—vol. 220 The American Society of Mechanical Engineers, pp. 1–8 (1997).

M. C. Rivara, Selective refinement/derefinement algorithms for sequences of nested triangulations, International Journal for Numerical Methods in Engineering, vol. 28, 2889–2906 (1989).

M. C. Rivara and C. Levin, A 3–D refinement algorithm suitable for adaptive and multigrid techniques, Communications on Applied Numerical Methods, vol. 8, 281–290 (1992).

M. C. Rivara and P. Inostroza, A discussion on mixed (longest–side midpoint insertion) Delaunay techniques for the triangulation refinement problem, Proceedings 4th International Meshing Roundtable, Albuquerque, USA, Oct. 16–17, pp 335–346 (1995).

M. C. Rivara, New mathematical tools and techniques for the refinement and/or improvement of unstructured triangulations, Proceedings 5th International Meshing Roundtable, Pittsburgh, USA, Oct. 10–11, pp 77–86 (1996).

M. C. Rivara, New longest–edge algorithms for the refinement and/or improvement of unstructured triangulations, International Journal for Numerical Methods in Engineering, vol. 40, 3313–3324 (1997).

S. N. Muthukrishnan, P. S. Shiakolas, R. V. Nambiar and K. L. Lawrence, Simple agorithm for adaptive refinement of three–dimensional finite element tetrahedral meshes, AIAA Journal, vol. 33, pp. 928–932 (1995).

P. L. George, F. Hecht, and E. Saltel, Fully automatic mesh generator for 3D domains of any shape, Impact of Computing in Science and Engineering, vol. 2, pp. 187–218 (1990).

* cited by examiner

| Vertex | VE-IND | G-EDGE |
|--------|--------|--------|
| A | 0 | NULL |
| B | 0 | NULL |
| C | 0 | NULL |
| D | 0 | NULL |
| E | 1 | DB |
| F | 1 | AB |
| G | 1 | CB |
| H | 2 | CF |
| I | 2 | EB |
| J | 2 | FB |

FIG. 16

LONGEST-EDGE MESH DATA STRUCTURE

| | | |
|---|---|---|
| EDGE:<br>    PV1, PV2<br>    LENGTH<br><br>    S1<br><br>    S2 | Pointers to the two vertices of EDGE<br>Lenght of EDGE<br><br>Set of pointers to the elements having<br>longest-edge equal to EDGE<br>Set of pointers to the elements having EDGE<br>as an edge and with longest-edge greater than<br>EDGE; S2 is empty for terminal-edges | 800 |
| ELEMENT:<br>    PV1, PV2, PV3, PV4<br>    PT1, PT2, PT3, PT4<br><br>    PLEDGE | Pointers to the four vertices of ELEMENT<br>Pointers to the four face-neighbor<br>elements<br>Pointer to the longest-edge of ELEMENT<br>in the EDGE representation | 820 |
| VERTEX:<br>    X1, X2, X3<br><br>    VE-IND<br><br><br><br><br><br><br>    PGENEDGE<br><br><br>    PELEMENT | Spatial coordinates of VERTEX<br><br>Vertex indicator value; equal to 0 if VERTEX<br>belongs to the initial mesh; equal to the succesor<br>of the maximum value between the VE-IND<br>values of the vertices V1 and V2, such that<br>VERTEX was obtained by longest-edge bisection of<br>the elements sharing edge V1-V2, otherwise<br><br>Pointer to the generator edge of VERTEX, that<br>is to preceding edge whose bisection produced<br>the vertex VERTEX<br><br>Pointer to one of the elements that share said<br>VERTEX | 840 |
| GEN-EDGE:<br>    PV1, PV2<br><br><br>    LENGTH | Pointers to the two vertices of the edge GEN-EDGE<br>(this edge does not exist as an edge in the<br>current mesh)<br><br>Length of the edge GEN-EDGE | 860 |

FIG. 17

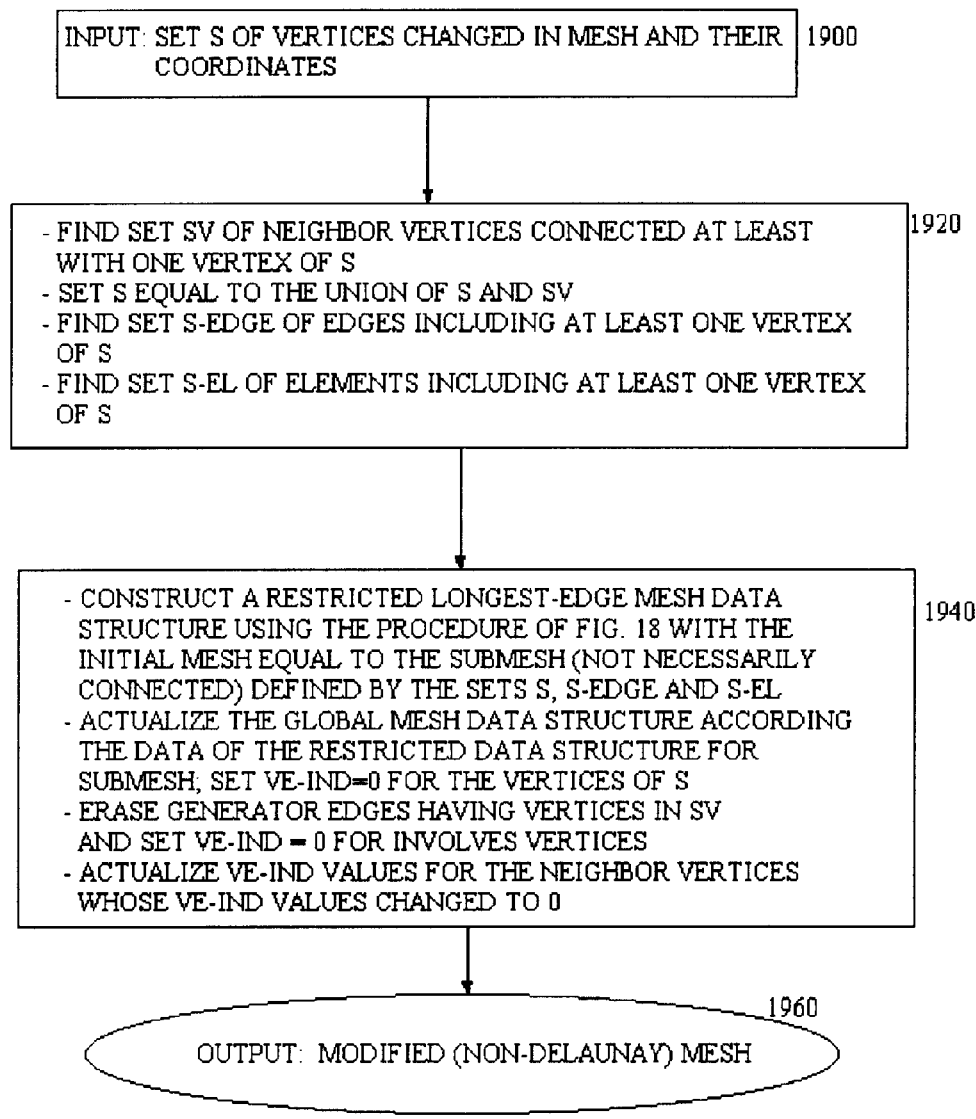

LONGEST-EDGE REFINEMENT AND DEREFINEMENT SYSTEM AND METHOD FOR AUTOMATIC MESH GENERATION

CROSS-REFERENCE TO RELATED APPLICATIONS

This application claims the benefit of U.S. Provisional Application No. 60/061,439, filed Oct. 8, 1997.

FIELD OF THE INVENTION

This invention relates to the computer geometric modeling of a body as needed through the use of finite element analysis. In particular the invention relates to the generation of an improved and/or refined and/or derefined mesh of finite elements using an improved and flexible mesh generation method, an improved mesh data structure, and an apparatus therefor.

BACKGROUND OF THE INVENTION

Finite element analysis is a powerful computer-aided tool for solving engineering and physical problems governed by partial differential equations. Finite element analysis is used in approximating any continuous physical characteristic of an object or a geometric region, such as temperature, heat, vibration, fluid flow, electric field, pressure, etc. Finite element analysis is specially important when the geometry of the object to be modeled is relatively complex, e.g. includes small details, since the differential equations for such applications become increasingly difficult to approximate accurately.

An initial step of a finite element analysis involves the construction of a mesh of finite elements covering the geometric region whose vertices are in turn points selected on the surface and in the interior of the object. Accurate and modern finite element analysis requires that a flexible mesh improvement/refinement/derefinement method, alternatively described as a point placement/elimination method, be used in order to produce a mesh that satisfies at least five criteria: (1) the overall point or vertex density is able to be specified and modified; (2) the density of vertices should increase and/or decrease in critical regions, (i.e., in those which have small features and concave corners or as needed in some time dependent problems); (3) badly-shaped finite elements should be avoided; (4) a mesh derived from a set of vertices should be able to be refined and/or derefined in certain areas by the user or the finite element analysis solving method; (5) the mesh should respect the object boundaries and interfaces.

It is known that the generation of a 3-D mesh suitable for finite element analysis has been one of the most time consuming steps in using the computer to analyze a complex engineering problem. Most previous work on 3-dimensional mesh improvement/refinement/derefinement and/or point placement/elimination has been heuristic in nature. For accurate analysis many approaches have required significant manual interaction between the user and the mesh generation system.

Several scientific articles considering mesh generation methods for use in finite element analysis have been published. In particular several papers appearing in the International Journal for Numerical Methods in Engineering consider the generation of a mesh by using the Delaunay triangulation. These papers are as follows: Cavendish et al., vol. 21, pp. 329–347, (1985); Frey, vol. 24, pp. 2183–2200, (1987); Schroeder et al., vol. 26, pp. 2503–2115, (1988); Schroeder et al. vol. 29, pp. 35–55, (1990); Golias et al., vol. 37, pp. 793–812, (1994); Field et al. vol. 31, pp. 413–425, (1991); Wheaterill et al., vol. 37, pp. 2005–2039 (1994);

Other papers considering Delaunay triangulation are the following: Baker, Engineering with Computers, vol. 5, pp. 161–175, (1989); Mitchell et al., IEEE Transactions on Magnetics, vol. 28, pp. 1751–1754 (1992); Ruppert, Journal of Algorithms, vol. 18, 548–585 (1995); Rebay, J. Comp. Physics, vol. 106, 125– 138 (1993); Joe, Siam J. Sci. Comput. vol. 16, 1292–1307 (1995).

Each of the aforementioned papers employs a teaching of Delaunay to achieve planar triangulation and three-dimensional tetrahedrization. A tetrahedral mesh is defined as a "Delaunay tetrahedrization" if and only if, for each tetrahedron in the mesh, the sphere defined by the four vertices of the tetrahedron, called its circumsphere, contains no mesh vertices in its interior. Vertices on the circumsphere's boundary are permitted. The same property applies to two-dimensional surfaces: a surface triangulation is defined as a Delaunay triangulation if and only if, for each triangle in the mesh, a circle defined by the three vertices contains no other vertices in its interior.

However, it is well known to those skilled in the art that the ability of the 3-dimensional Delaunay technique to produce quality meshes strongly depends on the point placement method. Quality is a very important factor since a bad-quality mesh can result in inaccurate numerical approximation. Consequently bad-shaped tetrahedra are to be avoided, especially undesirable "slivers," that is tetrahedra formed by 4 almost coplanar vertices and whose longest-edge and smallest-edge are of "comparable size". Most of the aforementioned papers discuss some point placement strategies and some mesh improvement and/or mesh refinement tools.

Cavendish et al. (1985) implement such a triangulation by rejecting from the set of all possible triangles which might be formed, those with non-empty associated circles. Those triangles not rejected, form the Delaunay triangulation. Schroeder et al. (1988) apply those teachings to three-dimensional surfaces.

Frey (1987) teaches a method for selective refinement of an initial triangulation. Grading of the mesh is controlled by a node spacing function wherein a prospective node is inserted and its spacing from adjacent nodes is evaluated. Each new prospective node is also tested to see if its insertion would lead to a Delaunay triangulation with an acceptable degree of spacing at new node. Shroeder et al. (1990) use an octree method for producing a set of points representing the geometry of the object.

Golias et al. (1994) describe an element-based method to perform automatic mesh refinement producing almost-Delaunay triangulations as follows: the midpoint of the longest edge of each target element is chosen and all the elements having this edge in common are partitioned; the non-Delaunay mesh thus obtained is then subjected to the repeated application of a set of local topological transformations performed over all the elements of the mesh, followed by an overall node relaxation technique, until the equilibrium of the mesh is achieved.

Field et al. (1991) also use local transformations for producing almost-Delaunay meshes satisfying a local max-min solid angle criterion. Weatheril et al. (1994) select the points to be added to the mesh between the centroids of the elements of the mesh by using different point distribution functions interpolated to the interior vertices. Baker (1989) considers the addition of a new vertex near each sliver followed by a retriangulation step. Mitchell et al. (1992) use an element size function throughout the mesh and a local realignment of the nodes for improving the mesh. Joe (1995) also uses local topological transformations for producing improved almost Delaunay meshes.

Ruppert (1995) teaches a point insertion method which guarantees the construction of good-quality 2-D Delaunay triangulations by adding points in the circumcenter of the worst small-angled triangles of the current mesh. Rebay (1993) teaches an alternative point insertion method based on selecting a maximal non-accepted triangle which is also adjacent to an accepted triangle; then selecting a point situated over the segment that joins the circumcenter of the two triangles.

In the scientific literature considerable attention has been also paid to methods that consider the refinement of any general non-Delaunay mesh by performing selective longest-edge bisection of a set of appropriate elements of the mesh. In 2-dimensions, longest-edge bisection is obtained by partitioning the element by the line defined by the midpoint of the longest-edge and the opposite vertex. In 3-dimensions, longest-edge bisection is in turn obtained by partitioning the element by the plane defined by the midpoint of the longest-edge and the two opposite vertices. It has been shown that longest-edge refinement methods improve the point distribution by maintaining some small-angled triangles which depend on the quality of the initial mesh. The following papers consider the application of these ideas and the generation of a mesh therefor:

Rivara, International Journal for Numerical Methods in Engineering, vol. 20, pp. 745–756, (1984a); Rivara, ACM Trans. on Mathematical Software, vol. 10, pp. 242–264 (1984b); Rivara, In Accuracy Estimates and Adaptive Refinements in Finite Element Computations, John Wiley and Sons, Chichester, pp. 359–370 (1986); Rivara, International Journal for Numerical Methods in Engineering, vol. 24, pp. 1343–1354 (1987); Rivara, International Journal for Numerical Methods in Engineering, Vol. 28, pp. 2889–2906 (1989); Rivara et al, Communications on Applied Numerical Methods, vol. 8, pp. 281–290 (1992); Liu et al., SIAM J. Sci. Computing, vol. 16, pp. 1269–1291 (1995); Liu et al., Mathematics of Computation, vol. 65, pp. 1183–1200 (1996); Muthukrishnan,et al. AIAA Journal, vol. 33, pp. 928–932, (1995); Jones et al., Computing Systems in Engineering, vol. 5, pp. 297–309, 1994.

Rivara (1984a) teaches two kinds of longest-edge bisection refinement methods in 2-dimensions, which produce some neighbor's refinement and some intermediate non-valid meshes, and demonstrates their mathematical properties; Rivara (1984b and 1986) discusses the application of those teachings in adaptive multigrid finite element analysis; Rivara (1987) teaches the implementation of a 4-triangles method also based on the properties of longest-edge bisections which also produces some intermediate non-valid meshes; Rivara (1989) generalizes those teachings to the derefinement of nested triangulations based on assigning to each new vertex its level of creation and using this "label" recursively to identify a set of vertices, edges and triangles to be eliminated. The derefinement method produces some intermediate non-valid meshes.

Rivara et al. (1992) teach and discuss a three-dimensional longest-edge refinement method based on performing recursive bisection of the target elements and some of their largest neighbors. Liu et al. (1995 and 1996) consider two kinds of 3-dimensional methods based on bisection.

Rivara (1984b) and Rivara et al. (1992) teach mesh data structures based on associating to each vertex, respectively, the set of ordered neighbor vertices, and the set of the triangular neighbor faces.

Muthukrishnan et al. (1995) teach a variation of the longest-edge method of Rivara et al. (1992) based on performing a sort of the list of elements to be refined in ascending order of their longest-edges; associating a refinement ratio to these elements and distributing it to their descendants; inserting the adjacent elements of each selected element into the list at a position based on its longest edge; and using the order to perform the element division process.

Jones et al. (1994) teach a parallel scalable bisection method for the refinement of 2-dimensional triangulations based on the 4-triangles method of Rivara (1984a) under the assumption that the processors communicate through a common shared memory. Each target triangle to be refined is assigned to a processor, which keeps track of the neighbor's refinement in the mesh producing intermediate non-valid meshes. In order to avoid synchronization problems (since two different processors could create vertices at the same location when bisecting a triangle), the parallel method determines sequences of independent sets of triangles and refines the triangles in these sets in parallel.

The following recent papers consider the combination of longest-edge point insertion techniques and Delaunay triangulations: Rivara et al., International Journal for Numerical Methods in Engineering, vol. 40, 581–597 (1997a); Rivara, Proceedings 5th International Meshing Roundtable, Pittsburgh, Oct. 10–11 1996, pp. 77–86 (1996); Rivara, International Journal for Numerical Methods in Engineering, vol. 40, 3313–3324 (1997); Rivara et al., AMD-vol. 220, The American Society of Mechanical Engineers, pp. 1–8 (1997b).

Rivara et al. (1997a) consider a Delaunay triangulation in 2-dimensions and teach a method that for each target element perform the Delaunay insertion of a cluster of points defined by the longest-edge bisection method taught by Rivara (1984a). This method improves the point distribution and maintains some small-angled triangles which depend on the initial triangulation.

Rivara (1996 and 1997) teaches a new longest-edge point insertion method for 2-dimensional Delaunay meshes which always improves the triangulation. For each target triangle, the point to be inserted is found by following the sequence of neighbor increasing triangles until the last two greatest triangles in the sequence share a common longest-edge called a terminal-edge. Then the midpoint of this longest-edge is Delaunay inserted in the mesh. Rivara (1997) proves that the systematic use of this method over the small-angled triangles of the mesh, produces good-quality triangulations with smallest angles greater than or equal to 30°. Rivara (1996 and 1997) also outlines a generalization of this method to 3-dimensions giving a rough 3-dimensional recursive method that, for each target element, follows a 3-dimensional propagation path associated with the longest-edge bisection method and performs the Delaunay insertion of a cluster of points over terminal-edges associated with the 3-dimensional propagation path. Rivara et al. (1997b) report numerical experimentation with both the 2-D and 3-D methods.

Rivara (1996 and 1997) also teaches recursive 2-dimensional and 3-dimensional longest-edge refinement methods for non-Delaunay quality meshes that produce the same meshes as the methods of Rivara (1984a) and Rivara et al. (1992) only partitioning sets of elements that share terminal edges of the mesh (all the elements of each set sharing the common terminal edge).

In U.S. Pat. No. 4,912,664 to Weiss et al., a 2-D approach to generating a mesh using Delaunay triangulation is described. Weiss et al. employ an expert-system based point placement method and an element quality criterion for point selection. In U.S. Pat. No. 4,933,889 to Meshkat et al., a further 2-D approach for generating a mesh using symmetric axis decomposition is disclosed. The method taught therein is not point based, but does employ the symmetric axis of a body to enable finite elements to be calculated.

In U.S. Pat. No. 5,214,752 to Meshkat et al., a 3-D automatic point placement method for generating a mesh using Delaunay triangulation is described. The method considers a subset of the vertices, and for each vertex selects the point to be inserted between points of intersection between a sphere of radius R centered at the vertex being considered, and the boundaries and edges. In addition, for eliminating sliver elements from the mesh, the center of the circumsphere corresponding to such element is inserted in the mesh.

In U.S. Pat. No. 5,315,537 to Blacker, an automatic quadrilateral surface discretization method and apparatus that produces mesh of all quadrilateral elements is disclosed. In U.S. Pat. No. 5,440,674 to Park, a 2-dimensional method for producing uniform and graded triangulations using 4 local operators is disclosed.

Further patents that disclose methods related with mesh generation are the following: Nackman, U.S. Pat. No. 4,797,842; Finnigan et. al., U.S. Pat. No. 5,345,490; Meshkat et al., U.S. Pat. 4,933,889; Shigyo et al., U.S. Pat. No. 4,941,114; Arakawa, U.S. Pat. No. 5,010,501; Arakawa, U.S. Pat. No. 5,398,307; Glassner, U.S. Pat. No. 5,428,717; Holmes, U.S. Pat. No. 5,497,451; Meshkat, U.S. Pat. No. 5,553,206; Akiyama, U.S. Pat. No. 5,774,696; Yamashita el al., U.S. Pat. No. 5,760,779; Yamamoto el al., U.S. Pat. No. 5,748,865; Strumulo el al., U.S. Pat. No. 5,729,670; Kumashiro, U.S. Pat. No. 5,677,846; Yokota, U.S. Pat. No. 5,617,332. Mesh generation can also be employed to enable the rendering of three-dimensional displays of various bodies, as described for example in: Falk, U.S. Pat. No. 4,888,713.

Despite the above, there is still much room for improvement to: improve mesh quality, refine/derefine a quality mesh, automatically control mesh grading and refinement/derefinement, automatically control point density by point insertion/elimination, eliminate undesirable slivers without using special techniques, and prevent badly-shaped mesh elements from appearing in the resulting mesh. It would be desirable to allow searching selected points to be inserted and/or eliminated considering only the distribution of increasing neighbor elements, not the Delaunay property of the mesh. It would desirable to allow the refinement/derefinement of the mesh avoiding the use of intermediate non-valid meshes. It would be desirable to allow the refinement/derefinement/improvement of the mesh by using non-recursive methods. It would be desirable to readily allow integrated improvement/refinement/derefinement of the mesh by taking full advantage of the properties of the geometric terminal-edge abstraction. It would be desirable to readily allow the parallel scalable refinement/derefinement of the mesh by locally modifying only sets of neighbor elements sharing a common edge (longest-edge) and requiring no interprocessor communication. It would be desirable to readily allow the management of Delaunay and non-Delaunay meshes. And it would be desirable to allow improved mesh data structures to implement integrated mesh improvement/refinement/derefinement techniques.

OBJECTS OF THE INVENTION

It is therefor an object of this invention to provide an improved point placement/elimination method and apparatus therefor, for use in a three-dimensional, automatic mesh generation system.

It is another object of this invention to provide an automated mesh improvement method, alternatively described as an improved point placement method, and apparatus therefor, wherein quality mesh improvement is automatically controlled.

It is another object of this invention to provide an automated mesh refinement/derefinement method, alternatively described also as an automated point placement/elimination method, and apparatus therefor, wherein mesh grading and mesh refinement/derefinement are automatically controlled.

It is another object of this invention to provide a point placement/elimination method and apparatus therefor, wherein point density is controlled automatically.

It is another object of this invention to provide an improved point placement /elimination method and apparatus therefor, which prevents badly shaped mesh elements from appearing in the resulting mesh.

It is another object of this invention to provide an improved non-recursive mesh refinement/derefinement method not requiring the use of intermediate non-valid meshes.

It is another object of this invention to provide an improved scalable method and apparatus therefor, for the parallel refinement/derefinement of the mesh by performing local work centered on modifying sets of neighbors elements sharing a common longest edge and requiring no interprocessor communication.

It is another object of this invention to provide an improved mesh data structure for the integrated implementation of the improvement/refinement/derefinement method of this invention and apparatus therefor.

It is another object of this invention to provide a method and apparatus which achieves faster processing time for the integrated refinement and/or derefinement and/or improvement of geometrical meshes.

SUMMARY OF THE INVENTION

A method, mesh data structure and apparatus is disclosed for producing an improved/refined/derefined mesh of finite elements for a three-dimensional object showing boundaries and faces. The improvement/refinement method repeatedly searching, for consecutive sets of active target elements to be refined or improved, an associated submesh and set of terminal edges, the searching process not modifying the mesh data structure; then according to the point insertion method chosen, selection of the point or the points to be inserted between the midpoints of the terminal edges modified by some boundary considerations; inserting the selected point or points in the initial mesh; and then proceeding to the succeeding set of active target elements until an user-defined stopping criterion is achieved.

The derefinement method, for each target vertex finding an associated set of neighbor vertices to be derefined; then eliminating each said vertex according an appropriate order such that the derefinement of said vertex allows to re-obtain a previous terminal edge whose bisection produced said vertex. The method, mesh data structure and apparatus of this invention allowing the parallel scalable refinement/derefinement of the mesh by locally modifying sets of neighbor elements sharing the common longest-edge.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

FIG. 16 is a table showing the corresponding associated VE–IND values and generator edges for each one of the vertices of the refined mesh of FIG. 14.

FIG. 17 illustrate the longest-edge mesh data structure schematically describing the EDGE, ELEMENT, VERTEX and GEN-EDGE representations.

FIG. 26 is a flow diagram further illustrating an operation from FIG. 25, namely the local actualization of the mesh data structure due to the modification of the vertex coordinates.

DETAILED DESCRIPTION OF THE PREFERRED EMBODIMENT OF THE INVENTION

This invention comprises an improvement/refinement method, a derefinement method, a mesh data structure, an integrated automated mesh generation method, and apparatus therefor.

Even when every component of this invention takes full advantage of the terminal-edge abstraction of a mesh of elements and its geometrical properties, and all these components can be adequately integrated to produce a flexible and automatic mesh generation system, the improvement component, the refinement component and the refinement/derefinement component can stand alone independent of each other in the sense that these components can be used separately in different applications. The derefinement method however only can be used to derefine meshes produced throughout the previous use of the longest-edge refinement method, and in this sense includes and generalizes the refinement method.

FIG. 1 to FIG. 5 refer to some geometrical issues of the method and apparatus of the present invention.

Figure 1:
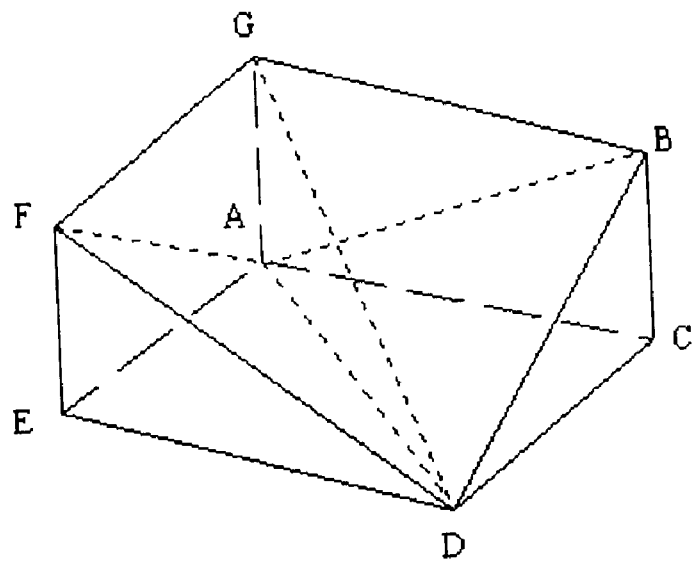
FIG. 1 is a perspective view of a three-dimensional object after it has been subjected to a tetrahedrization.
Figure 2:
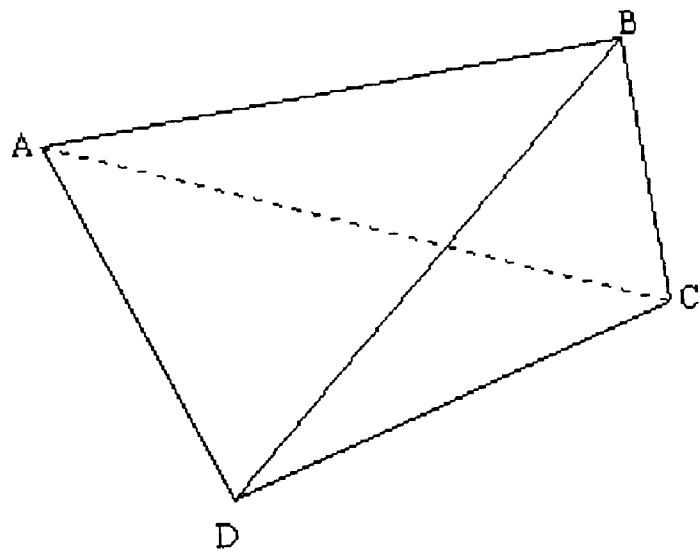
FIG. 2 is a perspective view of a tetrahedron found in FIG. 1 and exhibiting the longest-edge AB.

Referring to FIG. 1, a simple 3-dimensional object having vertices A, B, C, D, E, F and G has been subjected to a tetrahedrization. FIG. 2 shows one of the tetrahedra contained within FIG. 1 comprising vertices A, B, C, D; edges AB, AC, AD, BD, BC and DC, and triangular faces ACB, ADC, ADB and DCB. The "longest-edge" of tetrahedra ABCD is edge AB; that is, the edge whose length is greater than the length of each one of the remaining five edges AC, AD, BD, BC and DC. The method of the present invention considers either Delaunay or non-Delaunay tetrahedrizations.

Figure 3:
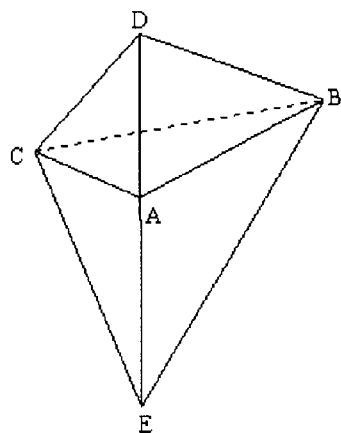
FIG. 3 is a perspective view of two neighbor tetrahedron sharing the common edge AB (case 1 of 2).
Figure 4:
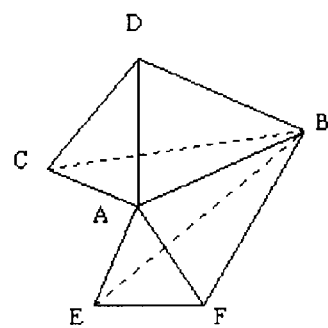
FIG. 4 is a perspective view of two neighbor tetrahedron sharing the common edge AB (case 2 of 2).

FIG. 3 and FIG. 4 illustrate examples of the only two unique possible cases of valid neighbor tetrahedra having longest-edge AB in common. In FIG. 3, two tetrahedra of vertices A, B, C, D and vertices B, C, A, E share the common triangular face ABC, and in particular the edge AB. In FIG. 4, the neighbor tetrahedra of respective vertices A, B, C, D and vertices A, B, E, F share only the common edge AB. In the more general case where the edge AB is an interior edge, there always exists a set of contiguous neighbor elements that fill the space around the edge AB.

The derivation of an initial tetrahedrization requires that coordinate values for each of the vertices of the body and its boundaries be input by the user. As can be seen from FIG. 7, (box 200), those values are also employed by this invention. Thus, the inputs for this invention comprise: the vertices of a model of the body being analyzed, the boundaries of the model and an initial tetrahedrization (mesh) of the object model.

The refinement/improvement method of this invention is based on repeatedly finding between the tetrahedra of the mesh, the set of neighbor tetrahedra having a selected edge in common, wherein this selected edge is the longest edge among the 6 edges of individual tetrahedra, as previously considered in connection with the example of FIG. 1. Starting with an active target element, and its corresponding longest edge, the repetitive use of this approach allows the identification of a "longest-edge" submesh which in a certain sense measures the local point distribution associated with this target element. Between the midpoints of a set of "terminal edges" situated on the "surface" of such submesh the point or points to be inserted in the mesh are selected.

The terminal-edges of a mesh, each of said terminal-edges corresponding to the common longest-edge of all the elements sharing said terminal-edge, are key components of the improved method and apparatus of the present invention, which take advantage of the following properties: (1) Terminal-edges of Delaunay meshes identify the best places (edges) such that the insertion of the midpoint of each of said terminal-edges improves the point distribution and the quality of neighbor elements; (2) The improved method and apparatus of the present invention make repetitive use of the identification of sets of terminal-edges of the mesh, this work being performed without modifying the mesh; (3) The improved (longest-edge) refinement/derefinement method of the present invention, at the end reduces to the local refinement and/or derefinement of individual terminal-edges of the mesh, said local work only involving the set of elements sharing each said terminal-edge; (4) The preceding two properties are used by the improved (scalable) method of this invention and apparatus therefor both for efficiently performing parallel search of the set of terminal-edges involved, and for the parallel local refinement and/or derefinement of terminal-edges requiring no interprocessor communication; (5) Properties (2) and (3) are used to design an efficient (shared) mesh data structure which is locally actualized whenever parallel refinement/derefinement of the mesh is performed.

The improvement/refinement method of this invention uses two alternative point insertion criteria according to a user-defined parameter: (1) Delaunay point insertion or (2) terminal-edges refinement. The Delaunay criterion is best suited for improving a mesh having bad-shaped elements. The terminal-edges refinement criterion is best suited for refining a mesh of quality elements as needed in adaptive and/or multigrid finite-element analysis applications (for a discussion see Rivara (1986)).

Figure 7:
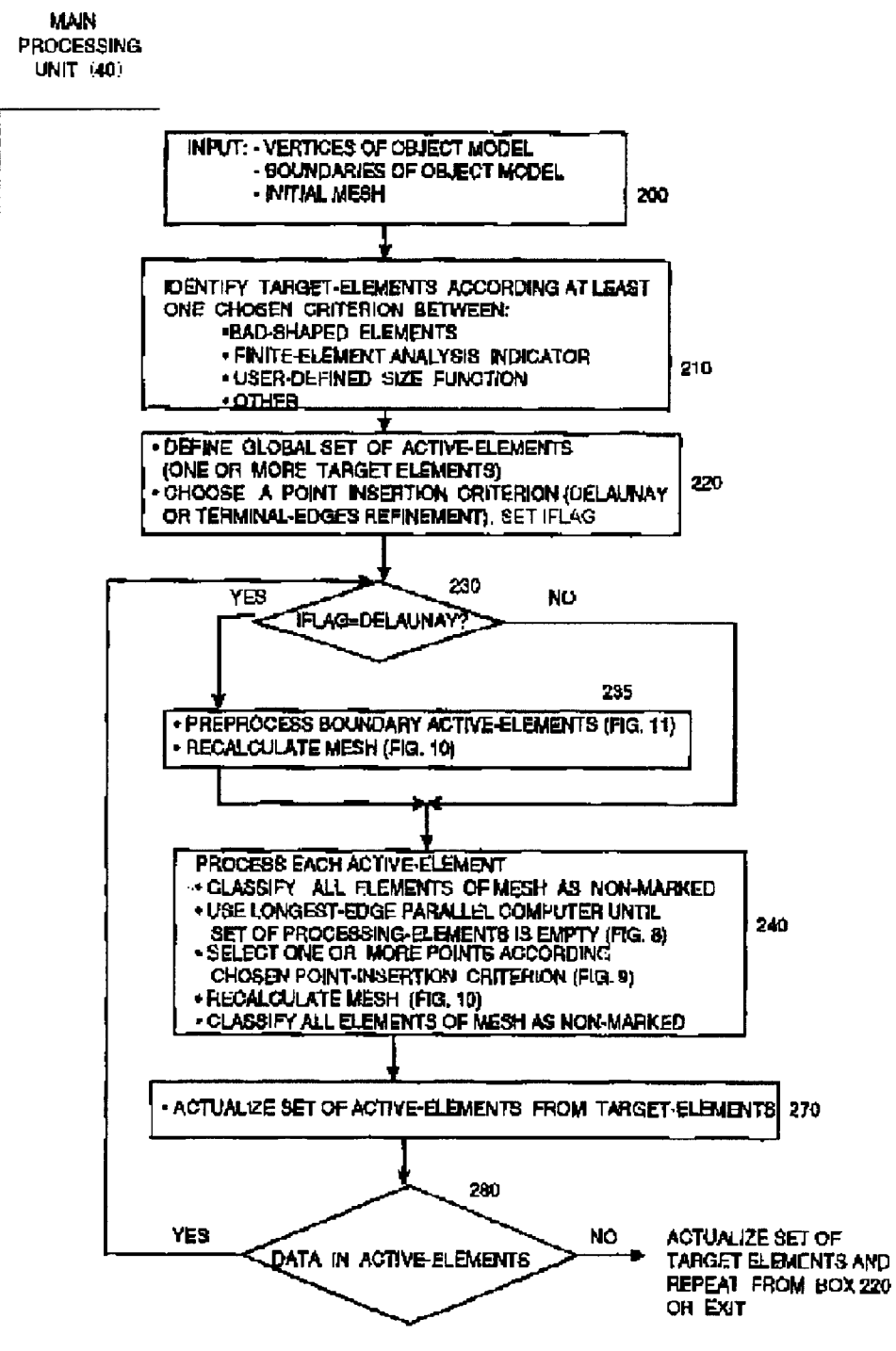
FIG. 7 is a high-level flow diagram describing the improvement/refinement method of this invention as carried forth by a main processing unit of the apparatus illustrated in FIG. 6.
Figure 9:
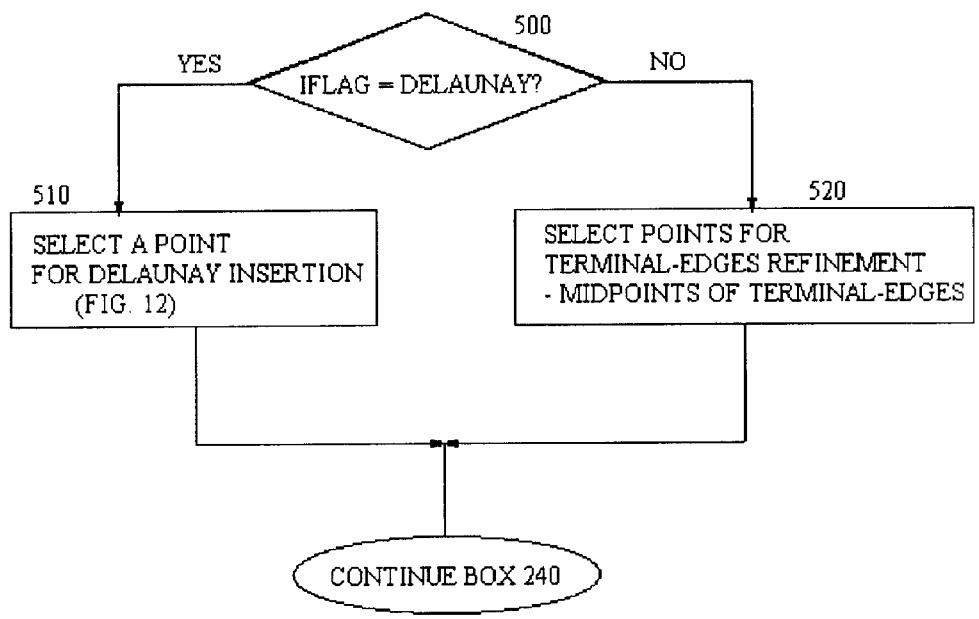
FIG. 9 is a flow diagram further illustrating an operation from FIG. 7, namely the selection of points according to chosen point insertion criteria.
Figure 12:
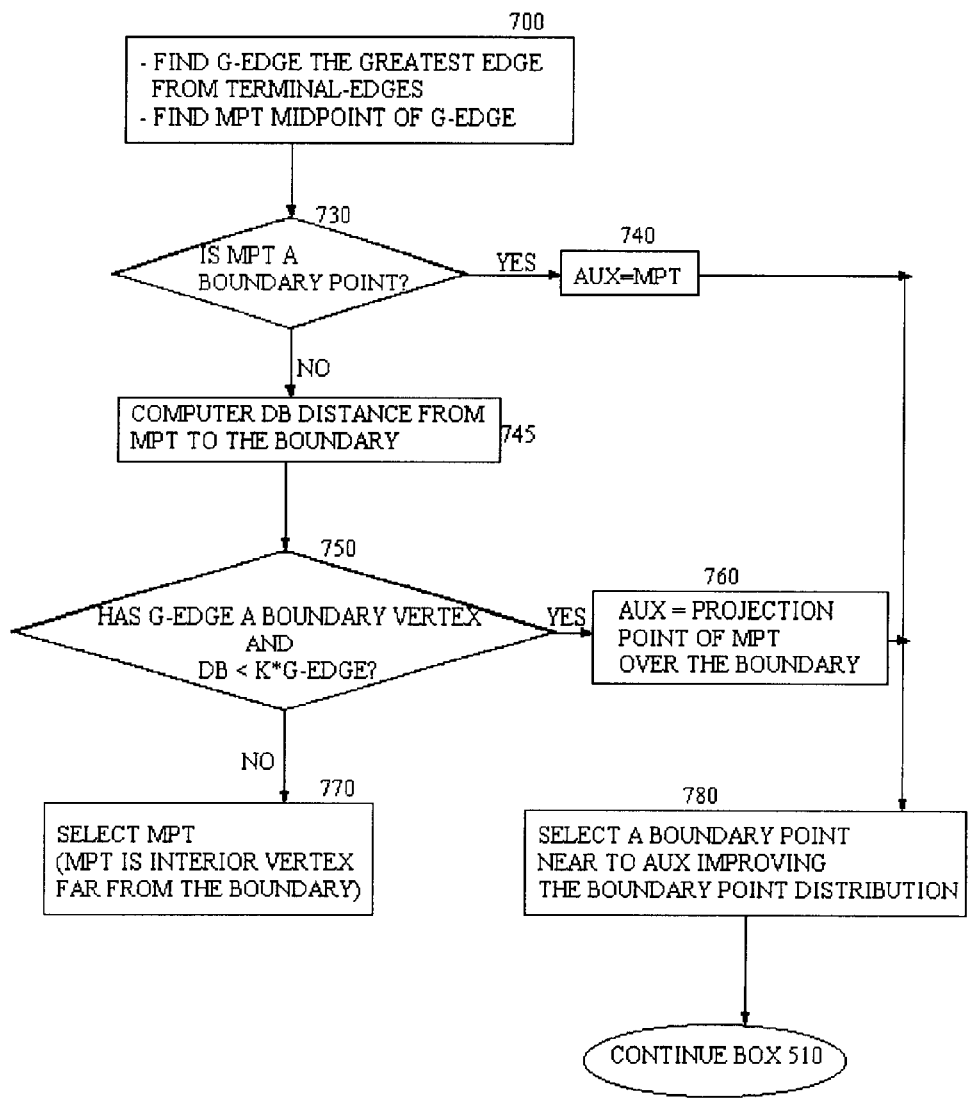
FIG. 12 is a flow diagram further illustrating an operation from FIG. 9, namely the selection of a point for Delaunay insertion.

When the Delaunay criterion is chosen for point insertion (via decision box 500, FIG. 9), and whenever some "interior" conditions are satisfied (see FIG. 12, boxes 730, 750), the midpoint of the largest terminal-edge is selected as a point to be inserted in the mesh (box 240 in FIG. 7 leading to box 510 in FIG. 9, and then to box 770 in FIG. 12). When terminal-edges refinement is chosen (again via the decision box 500 in FIG. 9), the midpoints of those terminal-edges are selected to be inserted in the mesh (box 520 in FIG. 9).

Figure 5:
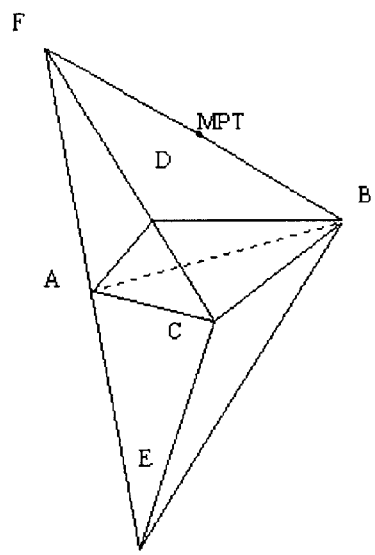
FIG. 5 is a perspective view of the longest-edge submesh associated with tetrahedron ABCD and exhibiting the terminal-edges EB and BF.

FIG. 5 illustrates a simple mesh where a tetrahedron of vertices A, B, C, D and longest edge AB, has 2 neighbor tetrahedra of respective vertices A, D, B, F and A, B, C, E which share the common edge AB. These tetrahedra have respective longest edges BF and EB with the length of BF being greater than length of EB. The three tetrahedra define the longest-edge submesh associated with the tetrahedron ABCD having terminal-edges BF and EB. Because edge BF is the largest terminal-edge, the prospective point for Delaunay insertion is the midpoint of BF, marked MPT. When terminal-edges refinement is chosen, the midpoints of both edges BF and EB are selected to be inserted in the mesh.

Initially a set of target elements is identified in the mesh (box 210 in FIG. 7). Adequate assignment and management of the set of target elements makes possible either adaptive mesh refinement, or automatic mesh improvement. For example, if a quality mesh is run through an adaptive finite element analysis, and fails to converge in some elements, the improvement/refinement method can be re-run automatically, with the set of target elements equal to those elements and the point insertion criterion chosen as terminal-edge refinement in box 220. When a mesh with some bad-shaped elements is considered in exchange, the improvement/refinement method can be re-run automatically, with the set of target elements equal to those elements and the point insertion criterion chosen in box 220 as Delaunay insertion. The criteria chosen in box 220, which sets an insertion IFLAG, then governs the outcome of decision box 230.

More generally, referring to FIGS. 6–12, the improvement/refinement method of the present invention is directed to a method and an apparatus for automatically generating an improved refined mesh of finite elements for an object to be analyzed, the object showing boundaries and faces. A longest-edge point placement method for automatically generating the improved refined mesh of the object is used.

Figure 6:
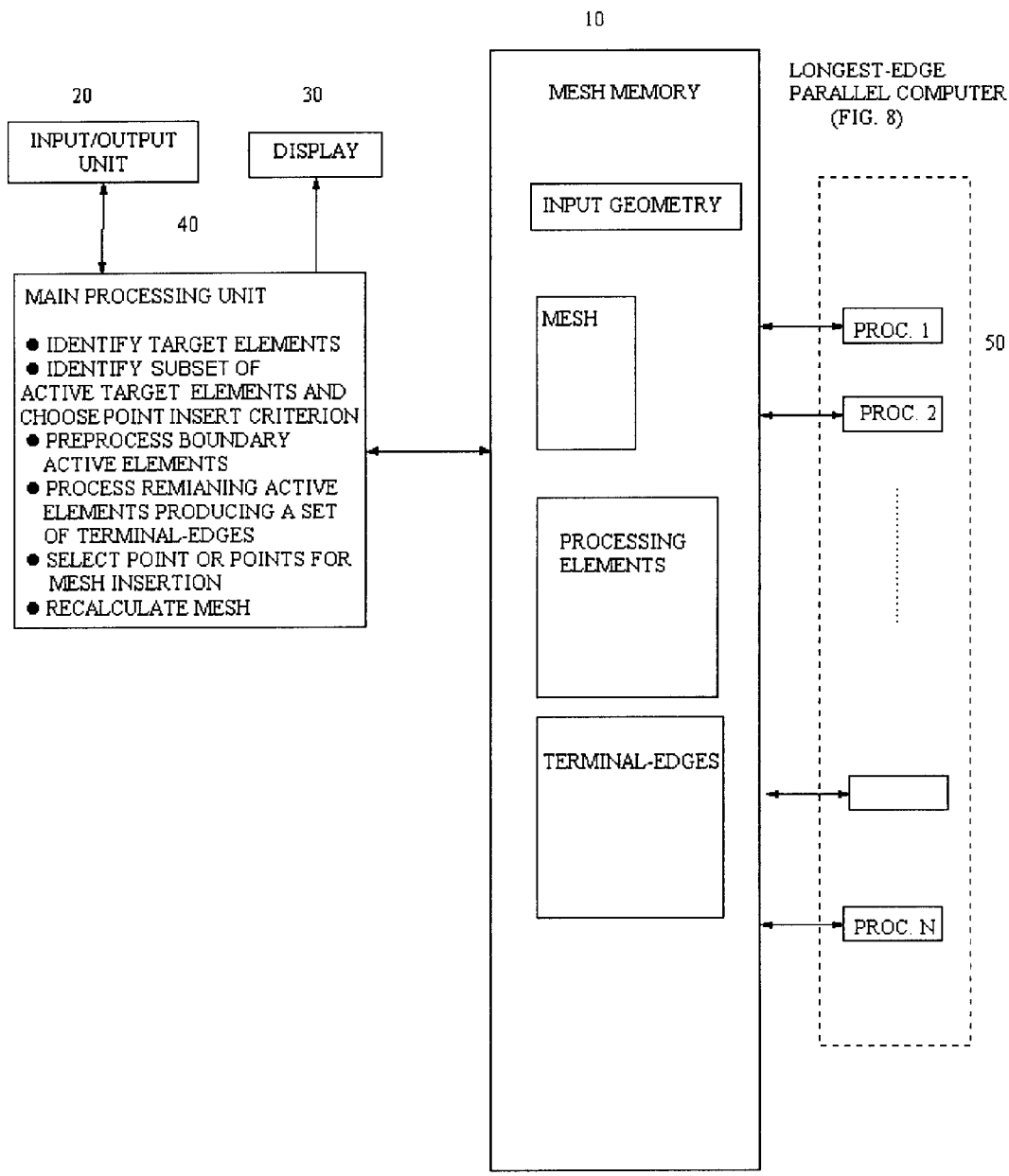
FIG. 6 illustrates the system architecture of the apparatus of this invention.

Referring to FIG. 6, a preferred embodiment for the improvement/refinement method of the present invention is shown, which includes the following means: (1) an input/output unit 20 for input of the geometrical data and output of the mesh; (2) a display unit 30 for visualizing the mesh and the point placement process; (3) a main processing unit (device) 40 for controlling the overall mesh improvement/refinement/derefinement process; (4) a mesh memory device 10 for storing the geometrical input data, the mesh data structure and auxiliary means for performing the mesh improvement/refinement/derefinement process; and (5) a parallel processing device 50 composed of N processors both for the parallel searching of sets of terminal-edges, and for the parallel refinement/derefinement of sets of elements related with selected terminal-edges.

The input/output unit 20 may be a conventional CAD/CAM input/output unit for entering the geometric data of the object into the mesh memory 10 and output of the mesh. An external Delaunay program, which for illustration, not limitation, is herein considered as being part of the input/output (CAD/CAM) device 20 and its associated programming, is also required.

Figure 10:
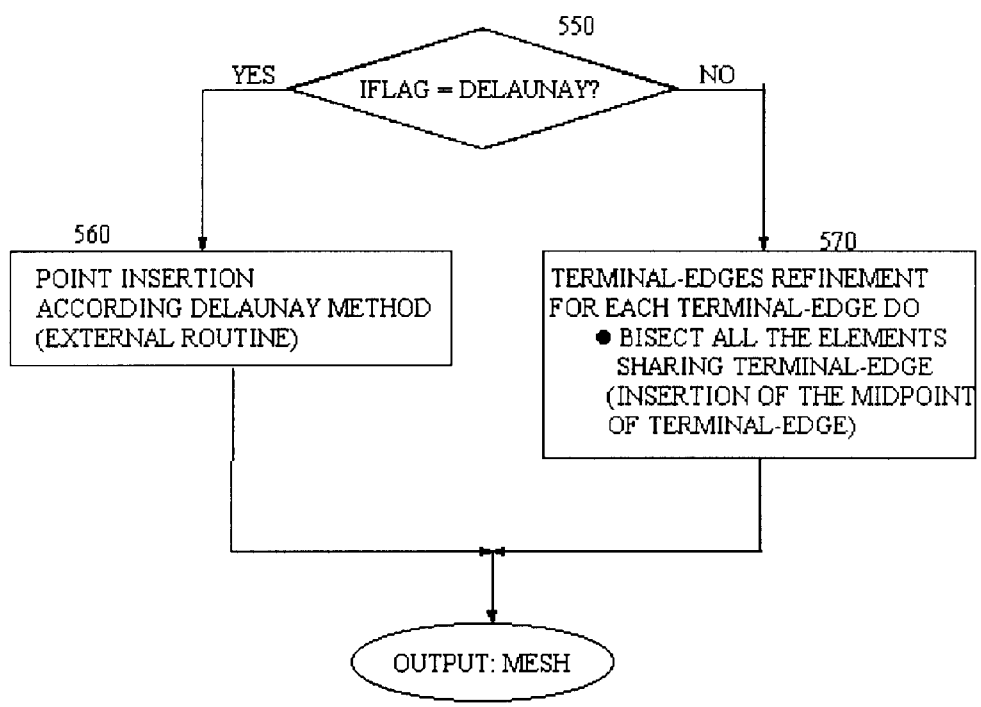
FIG. 10 is a flow diagram further illustrating an operation from FIG. 7, namely the mesh recalculation.

FIG. 7 is a high-level flow diagram describing the method of this invention as carried forth by the main processing unit 40, as follows: After input of the geometry data and the initial mesh (box 200), a set of target element is identified in the mesh (box 210). From among those target elements, a subset of one or more active target elements is selected and a point insertion criterion—Delaunay or terminal-edges refinement—is chosen (boxes 220, 230). Then, referring to box 240, by using the parallel computer 50 of FIG. 6 (said parallel computer 50 is detailed in FIG. 8), the set of active elements is processed; each said active target element producing a set of terminal-edges (box 460 in FIG. 8). Then, by using this set of terminal edges, the selected point or points are found (FIG. 9), which are in turn inserted in the (recalculated) mesh according to the chosen point insertion criterion (FIG. 10, box 550). In particular, referring to FIG. 10, for Delaunay insertion, the Delaunay method is employed (box 560), while for non-Delaunay insertion, terminal edge refinement is performed on each terminal edge (box 570). Finally the process is repeated for actualized sets of active elements and actualized sets of target elements until an user-defined stopping criterion is achieved (boxes 270, 280).

Figure 11:
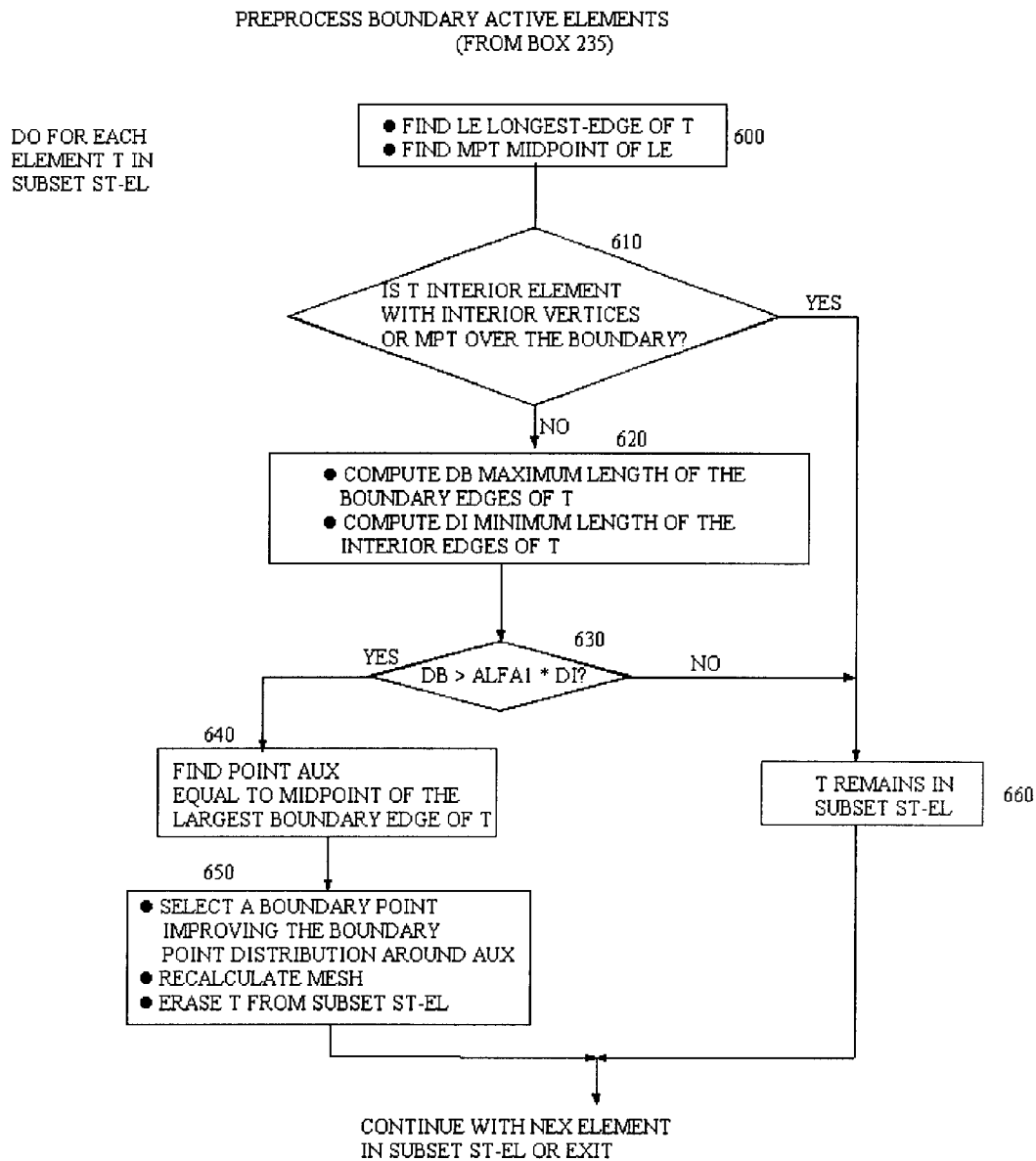
FIG. 11 is a flow diagram further illustrating an operation from FIG. 7, namely the preprocessing of boundary active elements.

When Delaunay point insertion is selected, a boundary preprocess (box 235 in FIG. 7), described in detail in FIG. 11, is used before initiating the process of box 240. Referring to FIG. 11, this works as follows: after the longest edge LE of each element T in the subset of target elements is found, and the midpoint MPT of each such LE is found (box 600), interior elements and elements having longest-edge over the boundary are not preprocessed (boxes 610, leading to box 660). Alternatively (via box 610), for each boundary processing element T having interior longest-edge LE, the distances DB and DI are respectively computed as the maximum length of the boundary edges of T, and the minimum length of the interior edges of T (box 620). If DB>ALFA1 * DI, where the parameter ALFA1 is a non-zero factor, (box 630), an auxiliary boundary point AUX equal to the midpoint of the largest boundary edge is found (box 640); and a boundary point improving the boundary point distribution around AUX is then selected and inserted in the mesh, proceeding also to erase T from the subset of active target elements (box 650). Such selected boundary point can be found, for example, by applying the method of this invention to a restricted 3-dimensional surface triangulation.

Figure 8:
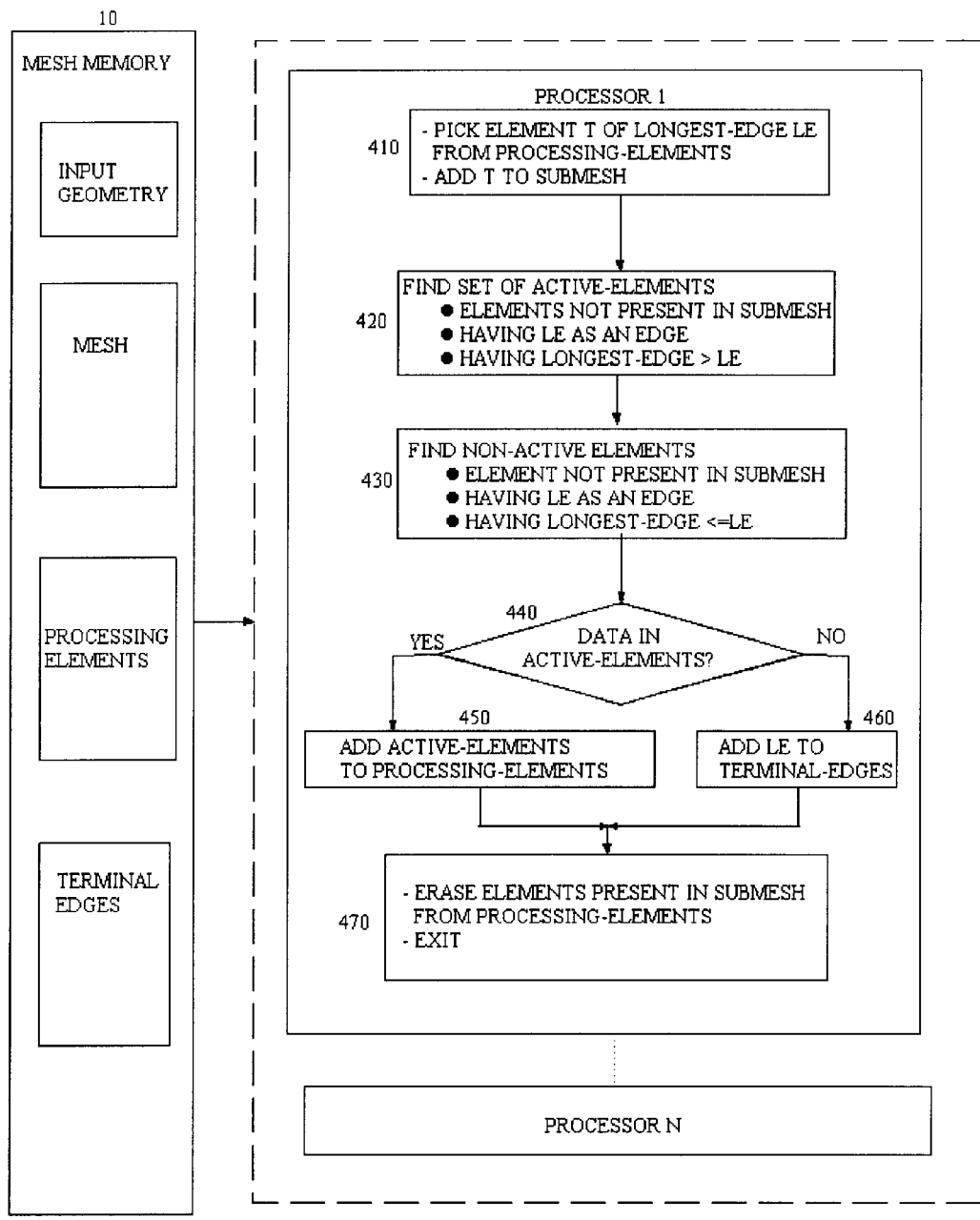
FIG. 8 is a high-level flow diagram describing the improvement/refinement method of this invention as carried forth by mesh-memory and longest-edge parallel computer units of the apparatus illustrated in FIG. 6.

FIG. 8 is a high-level flow diagram describing the method of this invention as carried forth by the mesh-memory (10) and longest-edge parallel computer (50) units of the apparatus illustrated in FIG. 6. In FIG. 8, for each processing element, the parallel processing begins with an empty processed submesh (box 240). Then each individual processor performs the following tasks as outlined in boxes 410 to 470: an individual processing element T of longest-edge LE is assigned to the processor, and the element T is marked as processed by adding T to submesh (box 410). For this processing element, two set of neighbor elements are identified: the set of active elements comprising the elements not present in submesh having LE as an edge, and whose respective longest-edge is greater than LE (box 420); and the set of non-active elements comprising the elements not present in submesh, having LE as an edge and whose respective longest-edge is less than or equal to LE (box 430). Then, at decision box 440, if the set of active elements is non-empty, each active element is added to the set of processing elements in the mesh memory 10 (box 450) for being later processed; otherwise there are not active elements associated with the element TE, and the edge LE is added to the set of terminal-edges in the mesh memory (box 460). Finally (each element in the set of non-active elements is marked as processed in the mesh, and) the set of processing elements is actualized by deleting (erasing) those elements already present in submesh (box 470).

Turning to FIG. 12, this Figure describes the point selection method when Delaunay point insertion has been chosen (boxes 500 and 510 in FIG. 9). The method proceeds as follows: once the set of terminal-edges has been found, G-EDGE, the greatest of those terminal edges in then found whose midpoint MPT is selected as a prospective point to be inserted in the mesh (box 700). If G-EDGE is an interior edge having interior vertices, the point MPT is selected to be inserted in the mesh (box 770). Otherwise, a boundary treatment is used, which comprising either: (1) selecting an auxiliary boundary point equal to MPT if MPT is a boundary point (boxes 730 and 740); or (2) selecting an auxiliary boundary point equal to the projection of MPT over the boundary if MPT is near to the boundary (boxes 750 and 760). Once the auxiliary boundary point is found, a boundary point situated in the neighborhood of such auxiliary boundary point and improving the boundary point distribution, is selected (box 780). Such boundary point can be found, for example, by applying the method of this invention to a restricted 3-dimensional surface triangulation. In any other case the point MPT, which is far from the boundary (box 770) is selected.

Referring again to boxes 210 and 220 of FIG. 7, when Delaunay point insertion is selected, the preferred embodiment for this invention considers the identification of sets of target elements and subsets of target elements as follows. For each element of the mesh, a geometry quality measure is computed. Whenever this element is a tetrahedron, this measure can be defined as the ratio between the volume of such element and the volume of the rectangular box of edge equal to the length of the longest-edge of this element; this ratio is multiplied by a normalizing constant in order to associate measure equal to 1 to the equilateral tetrahedron. The set of target elements is found by identifying as target elements, each element having its corresponding element quality measure by below a threshold. Optionally, the set of target elements is increased by adding sets of elements produced according some of the following criteria: elements having finite-element error indicator below a threshold value; elements whose longest-edge is below a value determined according a user-defined size function and/or other user-defined criteria. The subset of active target elements can be found, in exchange, by selecting from among the set of target elements, all those elements having their corresponding quality measure below a threshold value computed as a fraction of the average value of the element quality measure for the set of target elements. In addition, when the average value is above a parameter value, the global set of active elements is found by considering all the elements of the set of target elements.

FIGS. 13 to 16 refer to the geometric relation between the refinement and derefinement methods according to the invention.

Figure 13:
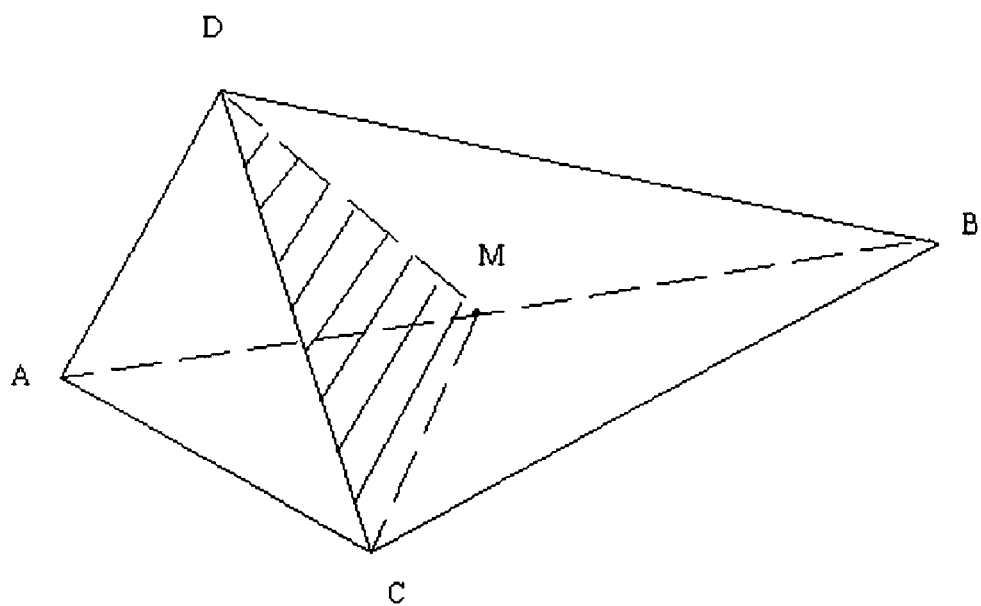
FIG. 13 is a perspective view of the longest-edge bisection of a tetrahedron of vertices A, B, C, D and longest-edge AB, where M is midpoint of AB.

Turning to the refinement method of the invention (IFLAG=TERMINAL EDGES—REFINEMENT in box 220 FIG. 7), said method is based on the longest-edge bisection of individual tetrahedra, as illustrated in FIG. 13 for the tetrahedron of vertices A, B, C, D and longest-edge AB, where M is the midpoint of edge AB. More specifically, the longest-edge bisection is repeatedly used to partition sets of elements, all the elements of each of said sets sharing a common (longest) terminal edge.

The longest-edge derefinement method of this invention can be described (in terms of the terminal-edge abstraction) as follows: for each target element to be derefined (or equivalently for each vertex VX to be eliminated), repeatedly find an associated set of element-sets, each element of each said element-set sharing a vertex VA and either edges VA-V1 or VA-V2 such that, the vertex VA was obtained as the midpoint of a previous terminal-edge of vertices V1, V2 in a previous mesh by longest-edge partition of each element sharing said terminal-edge in said previous mesh. Then, eliminate each said vertex VA in an appropriate order such that the elimination of vertex VA locally reduces to the elimination of elements sharing said vertex and to the creation of a set of new elements sharing said associated terminal-edge (box 1650 in FIG. 23). This local work is assigned to an individual processor of the parallel computer of FIG. 23.

For each target vertex VX to be eliminated (derefined), the preferred embodiment for the derefinement method of this invention finds the set of neighbor vertices to be eliminated (VERTEX-SET of box 1240 in FIG. 21) by taking advantage of the following additional (nestedness) properties of the longest-edge refinement method: (1) each new point is found as midpoint of the longest-edge of a previous element; (2) the shape and relative size of neighbor elements determine the order of precedence in the point generation process;(3) each new element remains completely contained in one or more predecessor elements and most of the new edges are indeed parts of previously existing edges.

Figure 18:
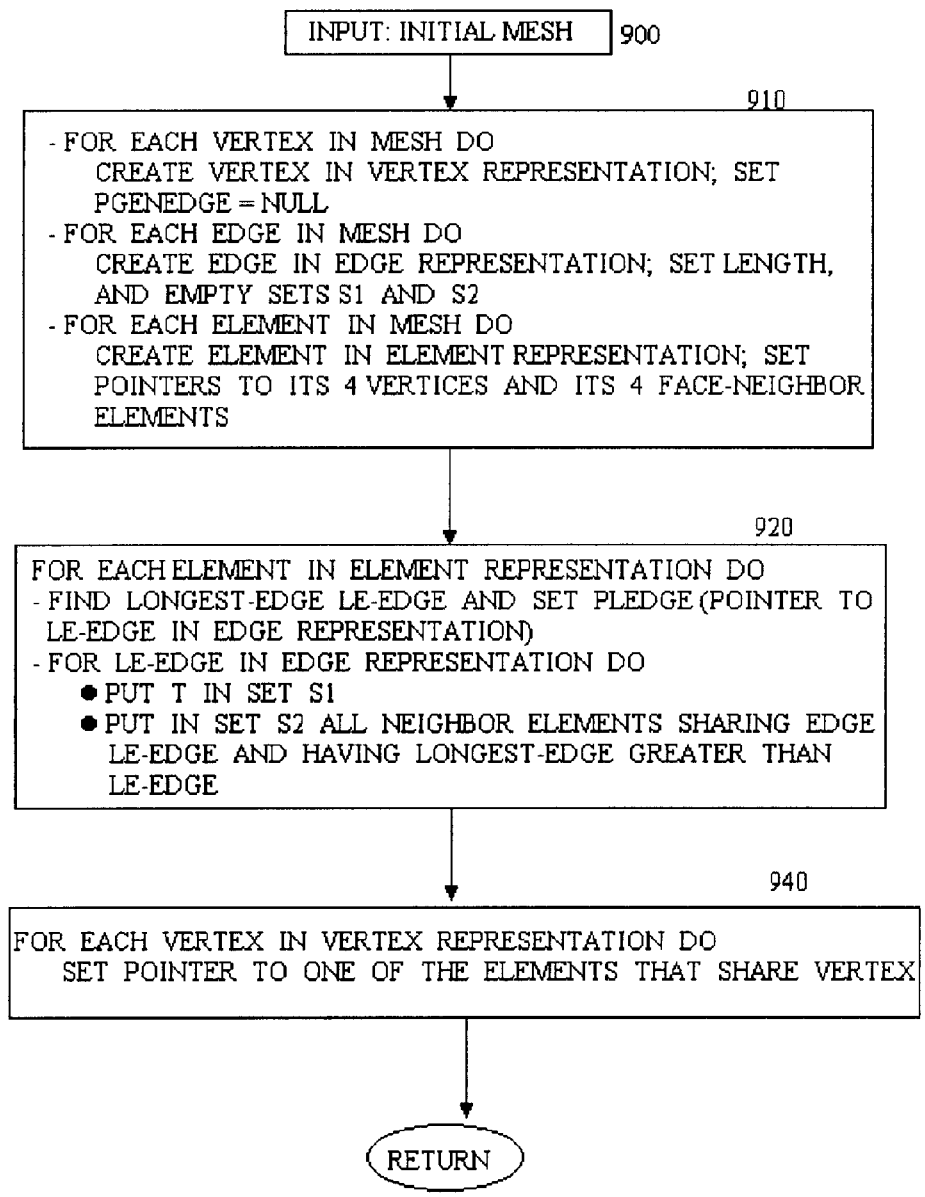
FIG. 18 is a high-level flow diagram describing the initialization of the longest-edge mesh data structure after the input of the initial mesh.

The preferred embodiment of the derefinement method of this invention uses an integer-valued indicator function VE-IND (associated with the relation of precedence in the generation process between each vertex and its neighbors), such that, for each vertex VE, either (1) VE-IND is equal to zero whether VE is a vertex of the initial or improved mesh (not obtained by using the longest-edge refinement method of this invention), initialized in box 910 of FIG. 18, or VE-IND is equal to the successor of the maximum value between the values of the VE-IND function for the vertices V1 and V2 (box 1060 in FIG. 19), where vertex VE is the midpoint of the "generator edge" V1–V2, the generator edge being a previously existing terminal-edge whose bisection produced the vertex VE.

Figure 14:
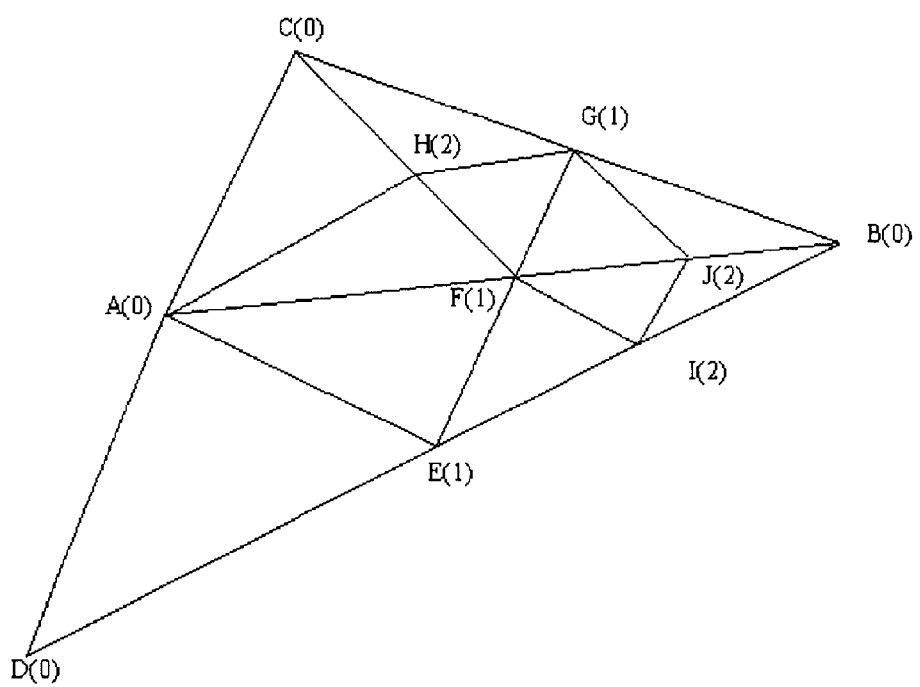
FIG. 14 illustrates a longest-edge refined two-dimensional (non-Delaunay) mesh, its vertices, and between parenthesis its associated VE-IND indicator values.
Figure 15:
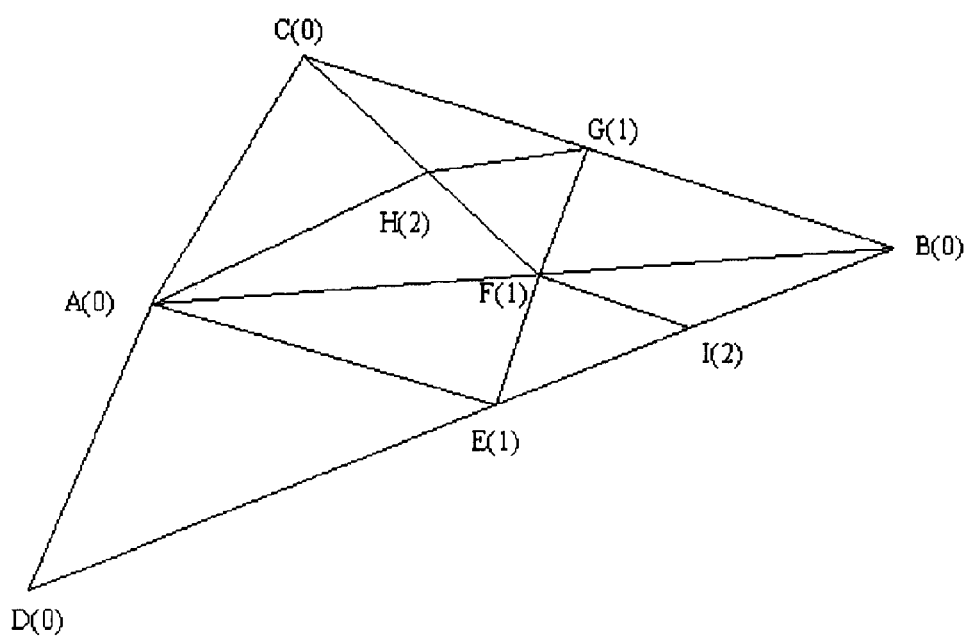
FIG. 15 illustrates the resulting mesh (after the derefinement of the vertex J of the mesh of FIG. 13 is performed), its vertices, and between parenthesis its associated VE-IND indicator values.

Referring to FIGS. 14–16, FIG. 14 illustrates a 2-dimensional refined mesh, its vertices and, between parenthesis, its associated VE-IND indicator values; FIG. 16 shows a table containing, for each vertex VE, its corresponding VE-IND value and its associated generator edge GENEDGE (G-EDGE). The vertices whose VE-IND value is equal to 0 (and whose generator edge is equal to NULL) correspond to the initial mesh and cannot be derefined throughout the process.

FIGS. 17 to 19, FIG. 24 and FIG. 26 refer to the (shared) mesh data structure for the preferred embodiment of the invention (related with box 10 in FIG. 8) designed to take advantage of the geometrical properties of the method and apparatus of the present invention, allowing: (1) The efficient implementation of the improvement/refinement/derefinement method of this invention and apparatus therefor; (2) The efficient implementation of the parallel finding of adequate sets of terminal-edges (FIG. 8) for selecting the point or points to be inserted in the mesh (improvement/refinement of the mesh); (3) The parallel scalable refinement of terminal-edges requiring no interprocessor communication as described in FIG. 20 (an improved alternative to box 570 in FIG. 10); and (4) The efficient parallel scalable derefinement of the mesh requiring no interprocessor communication as shown in box 1280 in FIG. 21 and in FIG. 23.

Referring to FIG. 17, the longest-edge mesh data structure of this invention corresponds to a mesh representation that takes advantage of (1) The inherent neighbor longest-edge relation existing between the elements of the mesh, valid for Delaunay and non-Delaunay meshes; and (2) the nestedness property of longest-edge refined meshes (for a discussion of this property see e.g. Rivara (1989)) adequately represented by both the VE-IND indicator function (which takes care of the relation of precedence between the vertices of the nested elements), and the GENEDGE representation which stores the generator edge of each vertex (the previous edge whose bisection produced said vertex) being each said vertex added to the mesh by longest-edge bisection of a set of neighbor elements sharing this common longest-edge. A preferred embodiment for the shared mesh data structure of this invention considers the following longest-edge representation (associated with the mesh and its construction): EDGE, ELEMENT, VERTEX and GEN-EDGE.

Each particular EDGE (box 800 in FIG. 17) is represented by means of: (1) two pointers to the two vertices (in the VERTEX representation) that define said EDGE; (2) The length of said EDGE; (3) A set S1 of pointers to the elements of the ELEMENT representation, such that said elements have longest-edge equal to said EDGE; (4) A set S2 of pointers to the elements (in the ELEMENT representation) such that said elements have said EDGE as an edge and whose longest-edge is greater than said EDGE (S2 is empty for terminal-edges of the mesh).

Each particular ELEMENT (box 820 in FIG. 17) is represented by means of: (1) Four pointers to the four vertices (in the VERTEX representation); Four pointers to the four neighbor elements (in the ELEMENT representation) having a common face with said element; (3) A pointer to an edge (in the EDGE representation) being said edge, the longest-edge of said ELEMENT.

Each particular VERTEX (box 840 in FIG. 17) is represented by means of (1) The spatial coordinates of said VERTEX; (2) A vertex-indicator value VE-IND, said value being equal to 0 if VERTEX belongs to the initial mesh (VERTEX has not been obtained by refining any preceding edge), or equal to the successor of the maximum VE-IND values of the preceding vertices V1, V2 where said VERTEX was obtained as midpoint of the preceding edge of vertices V1, V2, otherwise; (3) A pointer to the generator edge of said VERTEX (in the GEN-EDGE representation), said generator edge being a preceding edge not existing in the current mesh whose bisection produced said VERTEX; (4) A pointer to one of the elements (in the ELEMENT representation) having said VERTEX as a vertex.

Each particular GEN-EDGE (box 860 in FIG. 17) is represented by means of: (1) Two pointers to the two vertices (in the VERTEX representation) that define said GEN-EDGE as an edge (GEN-EDGE not existing as an edge in the current mesh); (2) The length of said GEN-EDGE.

FIG. 18 is a high-level flow diagram describing the initialization of the longest-edge mesh data structure, having the steps of: (1) After the input of the initial mesh (box 900), initializing the VERTEX, EDGE and ELEMENT representations as follows (box 910): For each vertex in mesh, creating vertex in VERTEX representation and setting VE-IND=O and PGENEDGE=NULL; For each edge in mesh, creating edge in the EDGE representation, setting LENGTH of edge, and empty sets S1 and S2; For each element in mesh creating element in ELEMENT representation and setting pointers to its 4 vertices and its four face-neighbor elements. (2) For each vertex in VERTEX representation setting pointer to one of the elements that share vertex (box 940). (3) Then (box 920), for each element T in ELEMENT representation proceeding as follows: (a) finding the longest-edge LE-EDGE of T and setting PLEDGE (pointer to LE-EDGE in EDGE representation); and (b) For LE-EDGE in EDGE representation, putting T in set S1, and putting in set S2 all neighbor elements sharing LE-EDGE and having longest-edge greater than LE-EDGE.

Figure 19:
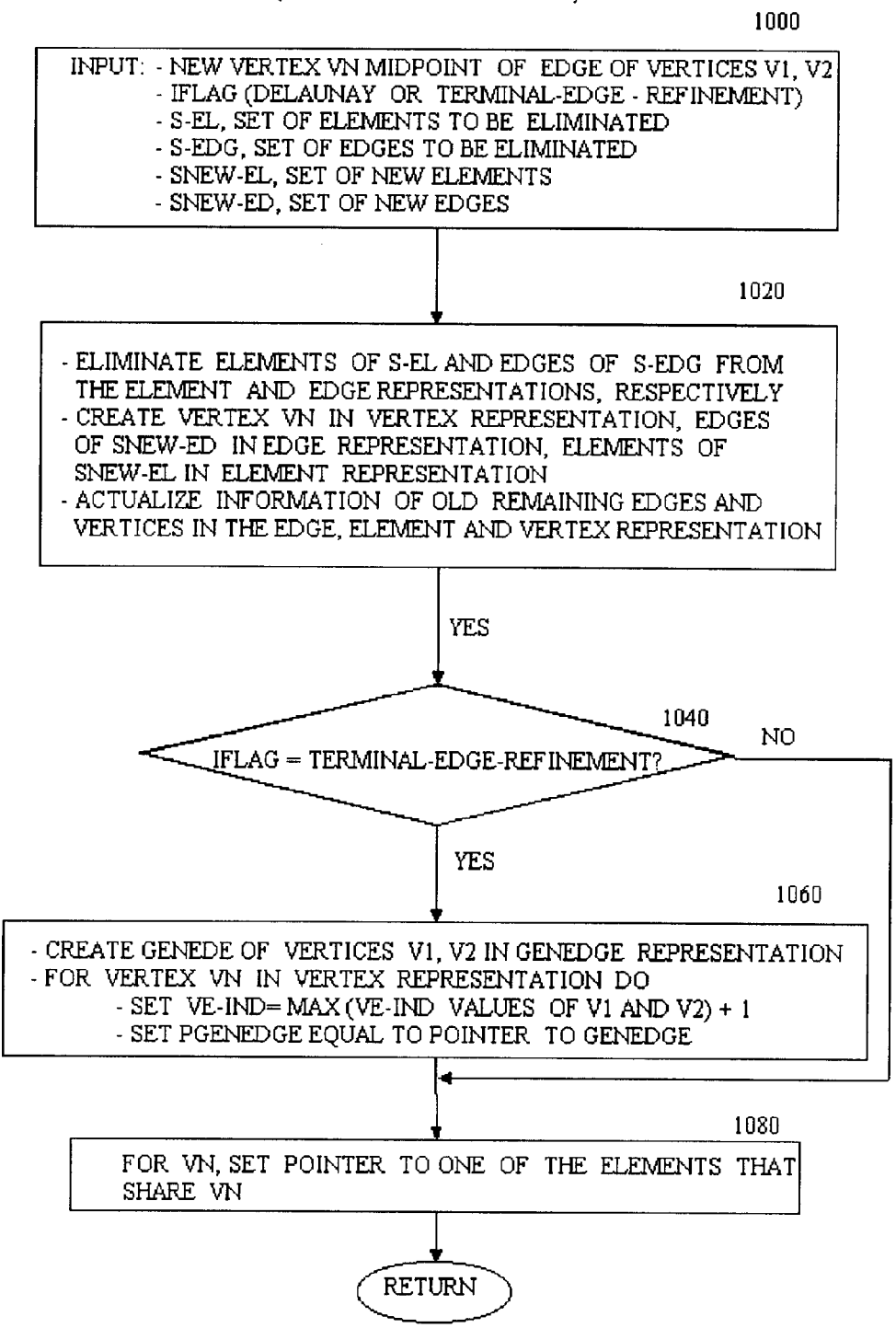
FIG. 19 is a flow diagram further illustrating an operation from FIG. 20, namely the modification of the longest-edge mesh data structure after refinement of a terminal-edge.
Figure 20:
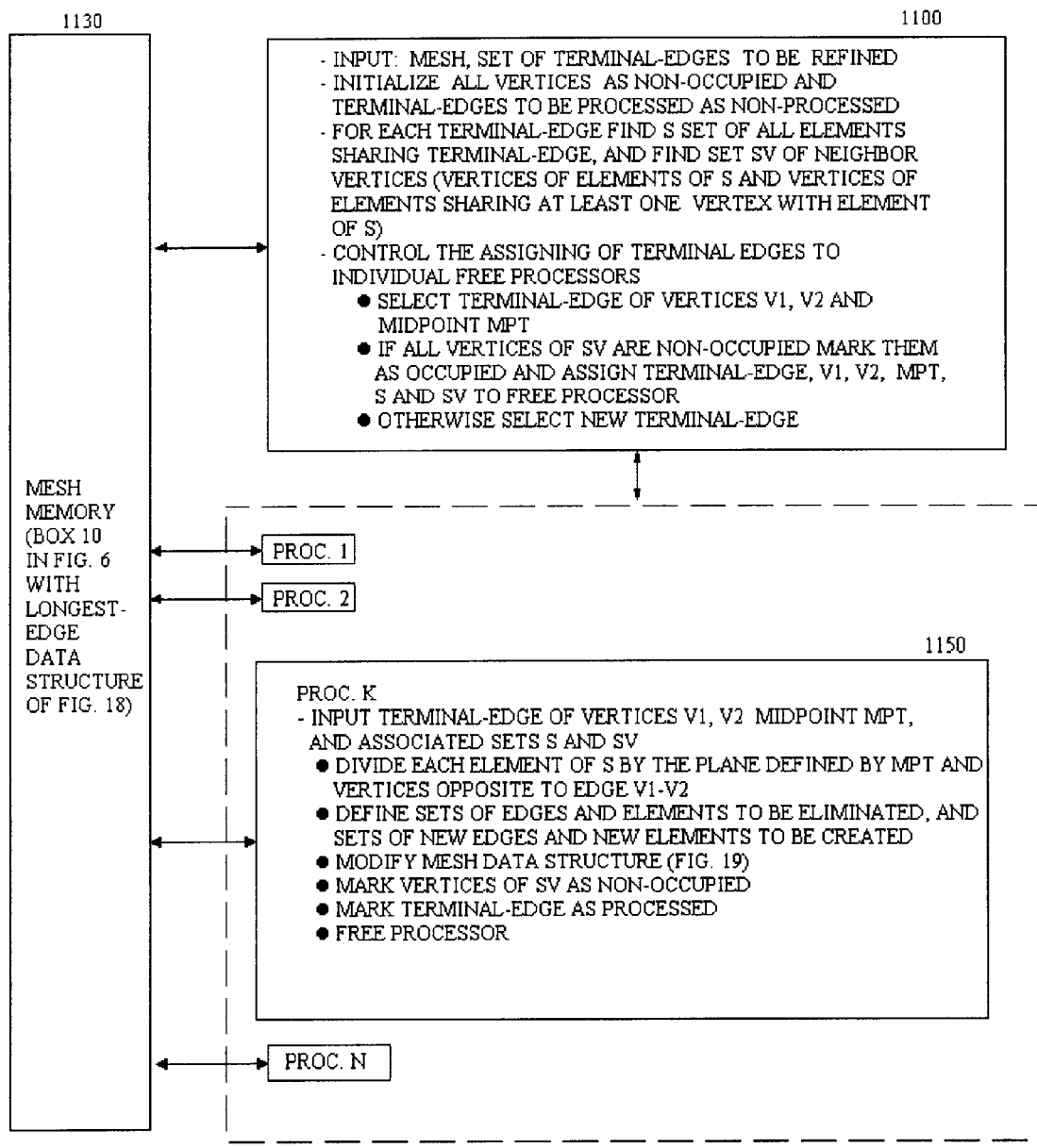
FIG. 20 illustrates the system architecture of an additional apparatus capable of performing the parallel refinement of the set of terminal-edges as an alternative to the box 570 in FIG. 10.
Figure 23:
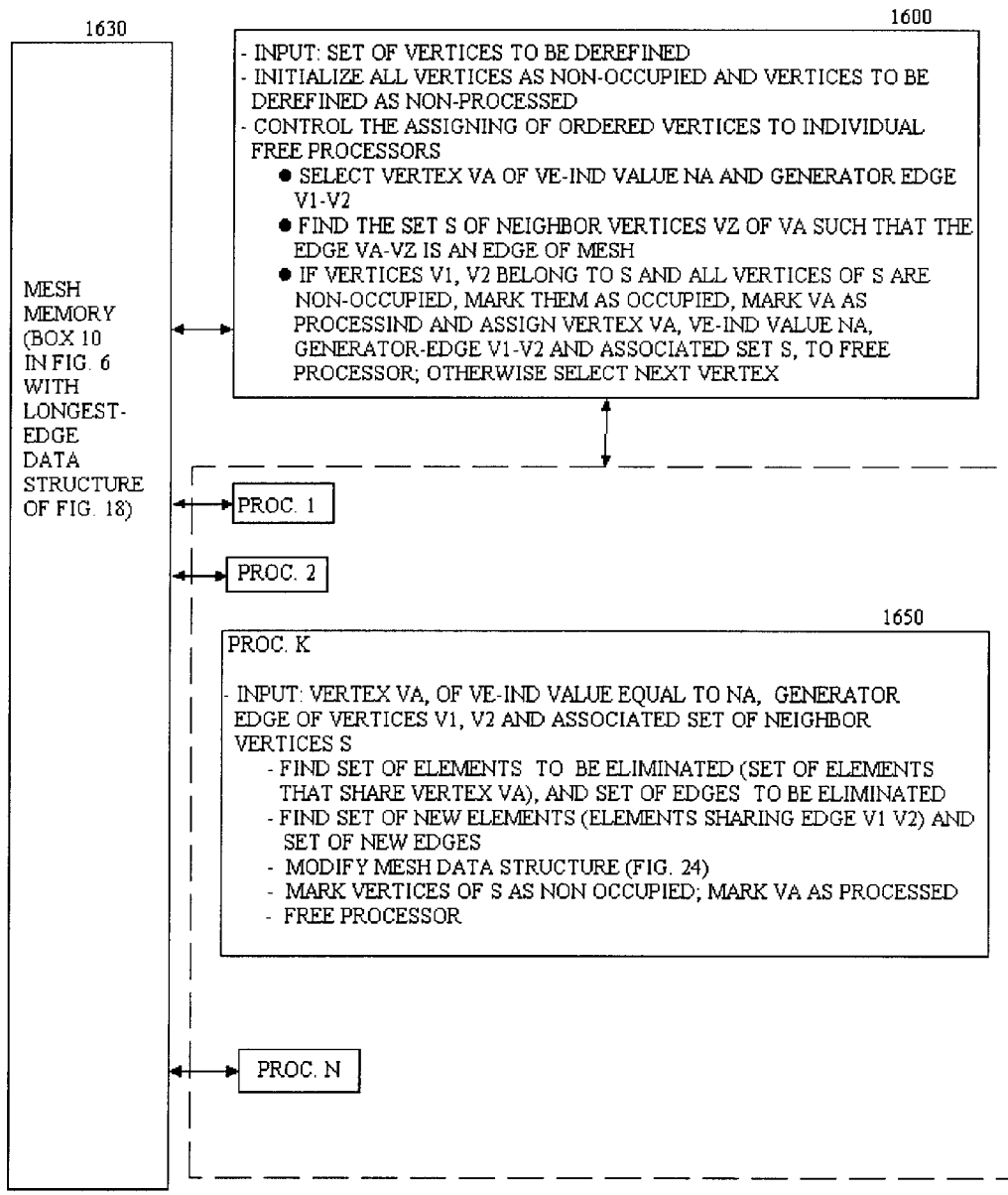
FIG. 23 illustrates the system architecture of an additional apparatus capable of performing the parallel derefinement of a set of selected vertices.
Figure 24:
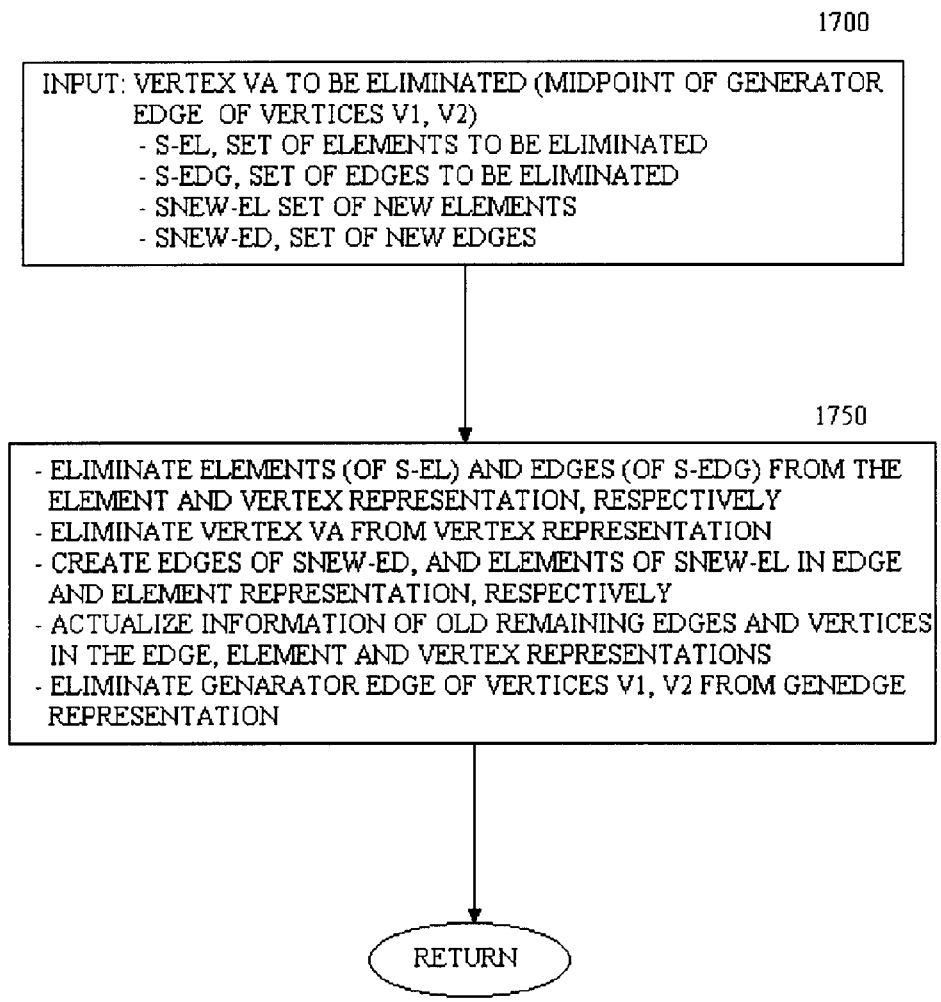
FIG. 24 is a flow diagram further illustrating an operation from FIG. 23, namely the local modification of the mesh data structure after the derefinement of an individual vertex.

The actualization of the longest-edge mesh data structure, either by point insertion (refinement) or by point elimination (derefinement) is locally performed by the parallel computers of FIG. 20 and FIG. 23 respectively which in turn modify the shared mesh data structure according the diagrams of FIGS. 19 and 24, respectively.

Turning to FIG. 20, this is a high-level flow diagram describing the system architecture of an additional apparatus capable of performing parallel scalable terminal-edge refinement (replacing and improving the work described by box 570 in FIG. 10), whenever the point insertion criterion equal to TERMINAL-EDGE-REFINEMENT has been selected (box 220 in FIG. 7). In this case a set of points is selected for point insertion (midpoints of the terminal-edges found in box 520) wherein each individual point is inserted by longest-edge partition of each one of the elements sharing the associated terminal-edge, as shown in FIG. 13. Being this an essentially local work, the parallel point insertion, requiring no interprocessor communication, proceeding as follows: The control machine of box 1100 interacting with the shared mesh memory of box 1130 performs the steps of (1) Inputting the mesh and the set of terminal-edges to be refined; (2) Initializing each vertex of the mesh as non-occupied and each terminal-edge to be processed as non-processed; (3) For each said terminal-edge, finding the set S of elements sharing said terminal edge, and the set SV of neighbor vertices containing the vertices of the elements of S and the vertices of the elements not included in S and having at least one vertex in common with one element of S; (4) Controlling the assigning of each individual terminal-edge (marked as non-processed) to one individual free processor whenever all the vertices of the set SV associated with said terminal-edge are marked as non-occupied; in such a case marking said assigned terminal-edge as processing and the vertices of set SV as occupied.

In addition, each individual processor performs the steps of (box 1150): (1) Inputting the terminal-edge T-EDGE of vertices V1, V2, midpoint MPT and associated sets S and SV; (2) Performing the terminal-edge refinement (or equivalently the MPT point insertion) following the substeps of: (a) Dividing each element of set S (elements sharing the terminal-edge) by the plane defined by MPT and vertices opposite to the terminal edge of vertices V1, V2 as shown in FIG. 13; (b) Identifying sets of elements and edges to be eliminated from the data structure and sets of new edges and elements to be added to the mesh data structure; (c) Modifying locally the mesh data structure as stated in FIG. 19; (d) Marking the vertices of SV as non-occupied; (e) Marking said terminal-edge as processed; and (f) Freeing the processor.

Turning to FIG. 19, this is a high-level flow diagram describing the local modification of the mesh data structure whenever one new point is inserted either by using Delaunay insertion (IFLAG=DELAUNAY in box 220 of FIG. 7) or by individual refinement of one terminal-edge (IFLAG=TERMINAL—EDGE—REFINEMENT in box 220 of FIG. 7). In both cases the new point inserted has been found as the midpoint of a terminal-edge of the current mesh. The data structure modification method (by point insertion) essentially comprises the steps of: (1) Inputting the following items (box 1100): the new vertex VN midpoint of the edge of vertices V1, V2; the associated IFLAG; the sets S-EL and S-EDG containing respectively the elements and edges to be eliminated from the mesh data structure; the sets SNEW-EL and SNEW-ED, sets of new elements and new edges respectively to be added to the mesh data structure. (2) Elimination of the elements of S-EL and the edges of S-EDG from the ELEMENT and EDGE representations respectively; (3) Creation of vertex VN in VERTEX representation, creation of the edges of SNEW-ED in the EDGE representation, and creation of the elements of SNEW-EL in the element representation; (4) Actualization of the neighborness information and longest-edge relations for the old remaining neighbor edges and vertices in the EDGE, ELEMENT and VERTEX representations.

When IFLAG=TERMINAL—EDGE—REFINEMENT has been chosen (via decision box 1040 leading to box 1060), the mesh data structure modification method comprises the additional steps of: (1) adding the generator edge of vertices V1, V2 to the GENEDGE representation; (2) for vertex VN in the vertex representation setting the associated VE-IND value equal to the successor of the maximum values between the VE-IND values of the vertices V1 and V2, and setting the associated pointer to said generator edge in the GENEDGE representation; and (3) For vertex VN in VERTEX representation, setting pointer to one of the elements sharing VN (box 1080).

When IFLAG=DELAUNAY is selected, decision box 1040 leads directly to box 1080 where for vertex VN in VERTEX representation, the pointer to one of the elements sharing said vertex is set.

Figure 21:
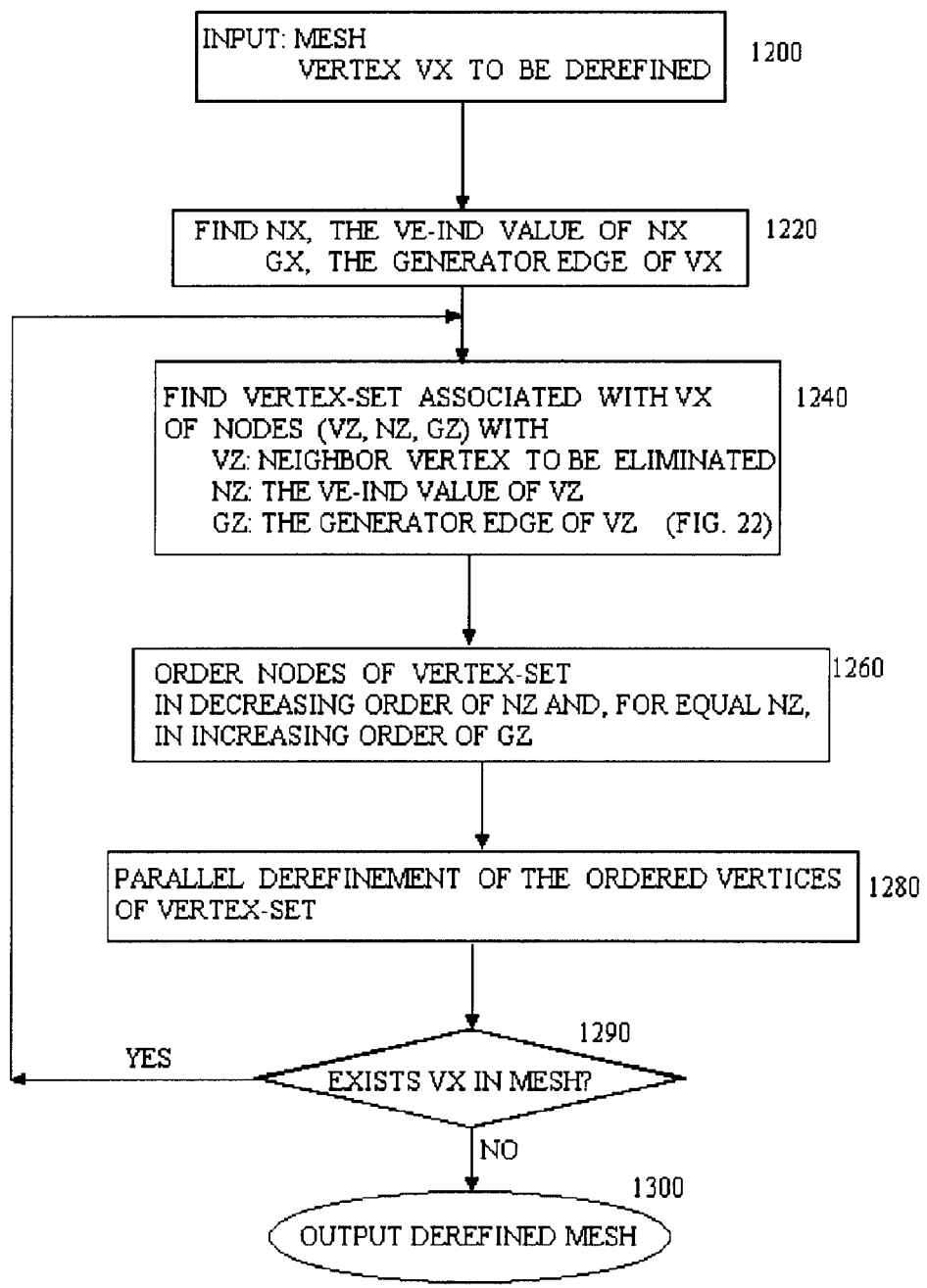
FIG. 21 is a high-level flow diagram describing the derefinement method of this invention

Turning to FIG. 21, the derefinement method of this invention essentially comprises, for each target vertex VX to be derefined or eliminated (box 1200) of associated node (VX, NX, GX), where NX is the VE-IND value of VX and GX its generator edge (box 1220), finding an associated VERTEX-SET of nodes (VZ, NZ, GZ) corresponding to the set of vertices to be eliminated from mesh (with their associated VE-IND values VZ and generator-edges GZ) as shown in box 1240. The ordered derefinement of each of said vertices (according the order stated in box 1260) allowing to re-obtain a terminal-edge previously refined throughout the refinement process as a consequence of the creation of the vertex VX. Repeating this process until the generator edge of vertex VX is also derefined (decision box 1290) and vertex VX is eliminated producing the derefined mesh (box 1300).

Figure 22:
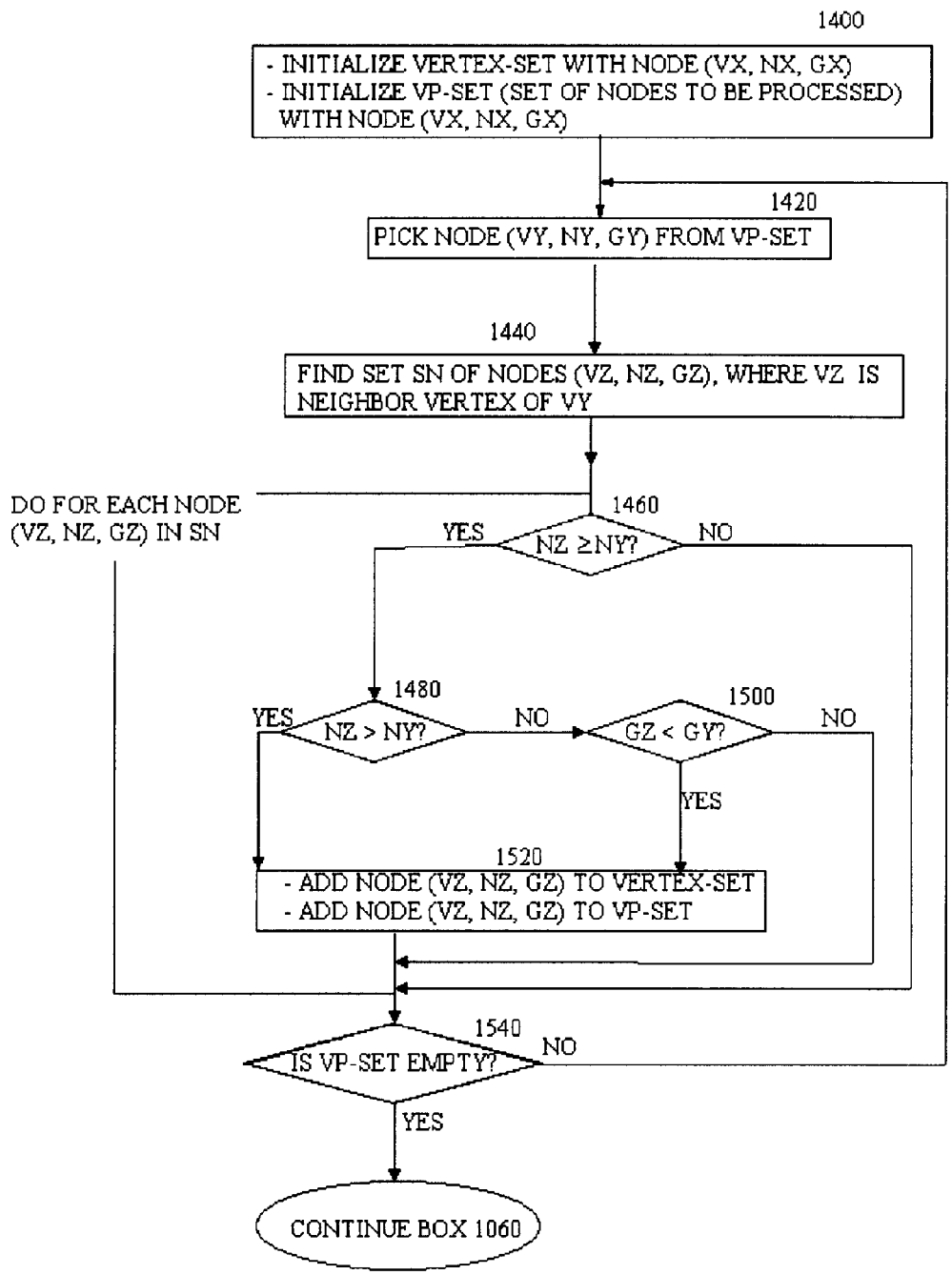
FIG. 22 is a flow diagram further illustrating an operation from FIG. 21, namely the construction of the vertex-set containing the vertices to be derefined from mesh.

FIG. 22 is a high-level flow diagram describing the incremental VERTEX-SET construction. The method comprises the steps of: (1) Initializing VERTEX-SET and VP-SET with node (VX, NX, GX), being VP-SET and auxiliary set storing the nodes to be processed (box 1400); (2) Picking node (VY, NY, GY) from VP-SET (box 1420); (3) Finding SN, the set of neighbor nodes (VZ, NZ, GZ) such that VZ is neighbor vertex of VY in mesh (box 1440); (4) For each node (VZ, NZ, GZ) in set SN doing as follows: if NZ>NY (decision boxes 1460, 1480 leading to box 1520) adding node (VZ, NZ, GZ) both to VERTEX-SET and to VP-SET; if NZ=NY (box 1480), and GZ<GY (box 1500) adding node (VZ, NZ, GZ) both to VERTEX20 SET and VP-SET. The node (VZ, NZ, GZ) is eliminated from the processing nodes otherwise; (5) Whenever VP-SET is not empty (box 1540), repeating the process again from box 1420 (picking a new node (VY, NY, GY) from VP-SET and so on). The process finishes when VP-SET is empty which produces the complete identification of the VERTEX-SET (set of nodes to be eliminated from mesh as a consequence of the elimination of the target vertex VX).

Turning to the 2-dimensional example of FIG. 14, the derefinement (elimination) of vertex G comprises selecting G and its successive neighbors having VE-IND function greater than or equal to the VE-IND function of the preceding vertex (vertices H, J, F and its neighbors); in the case of equal VE-IND function, only selecting the vertex when the length of the generator edge of said vertex is smaller than the length of the generator edge of the preceding vertex (box 1500). This discards both vertex E (neighbor vertex of F), and vertex I (neighbor vertex of J), since they have respective generator-edges greater than the generator-edge of its respective preceding vertex. This defines the VERTEX-SET (containing vertices G, H, J, F), set of the vertices to be derefined in the mesh. The derefinement of each of said vertices (i.e. vertex J of associated generator-edge FB in FIG. 14 producing the mesh of FIG. 15) simply comprises replacing the elements having vertex J in common, by greater elements having the generator-edge FB in common, being FB terminal-edge in the refined mesh of FIG. 15 (where FB is the longest edge of the surrounding elements GFB and FIB). The derefinement of the vertices is performed according the following order (box 1260 in FIG. 21): decreasing order of the VE-IND function and, for equal VE-IND values, in increasing order of the length of their associated generator-edges (vertices J, H, and F in this order in the mesh of FIG. 14). Said order guarantees the derefinement of terminal-edges such as described for vertex J. The method then proceeds to the parallel derefinement of the ordered nodes of VERTEX-SET (box 1280 in FIG. 21 and FIG. 23).

Turning to FIG. 23, this describes the system architecture of an additional apparatus capable of performing parallel scalable derefinement of the ordered vertices associated with the nodes of VERTEX-SET (box 1280 in FIG. 21).

Being this an essentially local work, the parallel point derefinement (elimination) requiring no interprocessor communication, proceeds as follows: the control machine of box 1600, interacting with the shared mesh memory of box 1630, performs the steps of: (1) Inputting the ordered set of vertices to be derefined; (2) Initializing all vertices of mesh as non-occupied and all vertices of the set of vertices to be derefined as non-processing; (3) Controlling the ordered assigning of the individual vertices to an individual free processor as follows: (a) Select the following vertex VA of VE-IND indicator value NA and generator edge of vertices V1, V2; (b) Find the set S of neighbor vertices VZ of VA (the edge VA-VZ is an edge of mesh); (c) If the vertices V1, V2 belong to S and all vertices of S are marked as non-occupied then marking them as occupied, marking vertex VA as processing and assigning the vertex (and its associated NA, V1, V2 and S) to an individual free processor. Otherwise select next vertex.

For each assigned new vertex (box 1650), the corresponding individual processor performs the steps of: (1) Inputting the vertex VA, its VE-IND value NA, its generator edge of vertices V1, V2 and associated set of neighbor vertices S; (2) Finding the set of elements to be eliminated from mesh (elements sharing the vertex VA) (3) Finding the set of new elements of mesh (new elements sharing the terminal edge V1–V2) and the set of new edges to be added to mesh (new edge V1–V2); (4) Modifying locally the longest-edge mesh data structure as stated in FIG. 24; (5) Marking the vertices of S as non-occupied and marking VA as processed; (6) Freeing the processor.

Turning to FIG. 24, this is a high-level flow diagram describing the local modification of the mesh data structure whenever one existing point is derefined from the current mesh (box 1650 in FIG. 23). The data structure modification method (by vertex elimination) performing the steps of: (1) Input of the vertex VA to be derefined, its generator edge V1–V2 and sets S20 EL, S-EDG, SNEW-EL, and SNEW-ED, respectively set of elements to be eliminated from mesh, set of edges to be eliminated from mesh, set of new elements to be added to mesh and set of new edges to be added to mesh (box 1700); (2) Then proceeding to the local actualization of the mesh data structure as follows: (a) Elimination of the elements of S-EL and the edges of S-EDG from the ELEMENT and EDGE representations respectively; (b) Creation of the edges of SNEW-ED and the elements of SNEW-EL in the EDGE and ELEMENT representations respectively; (c) Actualization of the neighborness and longest-edge information relating new elements and new edges with the remaining neighbor elements and edges in the EDGE, ELEMENT, and VERTEX representations; (d) Elimination of the generator edge of vertices V1, V2 from the GENEDGE representation.

Figure 25:
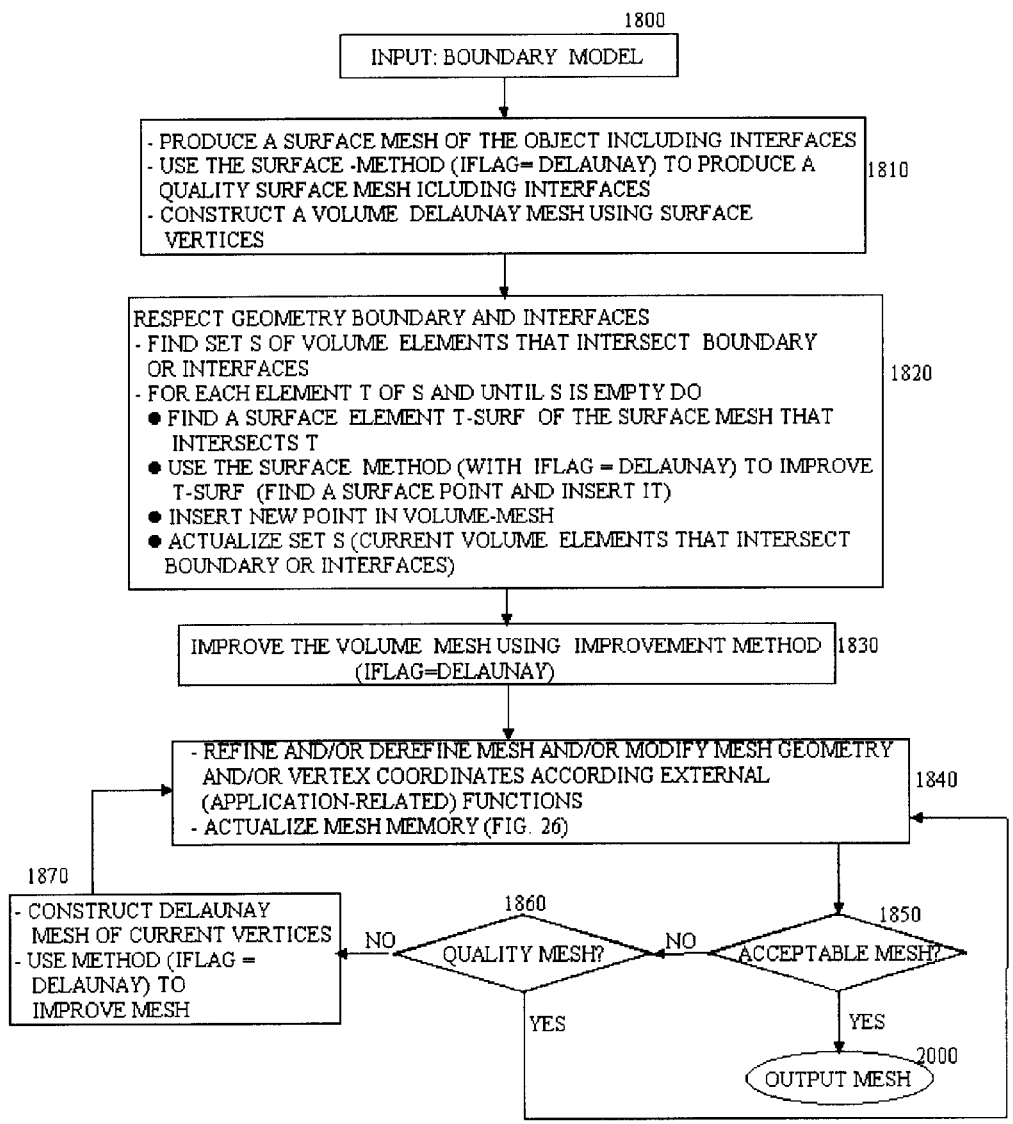
FIG. 25 is a high-level flow diagram illustrating a preferred embodiment for an integrated mesh generation method.

Referring to FIG. 25, this figure describes a preferred embodiment for an automatic mesh generation method which integrates and takes full advantage of the different methods of this invention. The integrated method in particular considers the following issues: (1) Combined use of both the surface improvement method and the volume improvement method of this invention in order to induce the respect of the object boundary and geometric interfaces whenever the input volume mesh has elements intersecting the object boundary and/or some geometric interfaces; (2) Combined use of both the surface improvement method and the volume improvement method of this invention for producing a quality mesh adapted to the geometry; (3) Use of the longest-edge refinement/derefinement method of this invention for producing refined/derefined quality meshes; (4) The use of external mesh modification methods, as in the case of changing object boundaries and/or interfaces, and the corresponding actualization of the mesh data structure.

After input of the boundary model (box 1800), the integrated method comprises the steps of (box 1810): (1) Producing a surface mesh of the object boundary including interfaces; (2) Using the surface improvement method of this invention (with IFLAG=DELAUNAY) to produce a quality surface mesh including interfaces; (3) Using the surface vertices to produce a volume mesh; (4) Proceeding to respect the geometry boundary and interfaces (box 1820) as follows: Finding the set of volume elements that intersect the boundary or interfaces; then for each element T in S and until S is empty performing the steps of: (a) Finding a surface element T-SURF of the surface mesh that intersects T; (b) Using the surface improvement method (with IFLAG=DELAUNAY) for selecting a neighbor point and inserting it in the surface mesh; (c) Inserting the new point in the volume mesh; (d) Actualizing the set S of current volume elements that intersect the boundary and interfaces.

Once a volume mesh respecting the boundary and interfaces is obtained, the integrated method proceeds to improve the volume mesh using the improvement volume method of this invention with IFLAG=DELAUNAY (box 1830).

Once a volume quality mesh has been obtained, the integrated method then proceeds to use the refinement method of this invention followed by the combined use of the refinement/derefinement method of this invention and optionally using an external mesh modification method, producing an actualized mesh (box 1840), and then proceeding to actualize the mesh data structure whenever the object geometry (boundaries and/or interfaces) and/or some vertex coordinates have been changed (box 1840 and FIG. 26), all the changes reducing to vertex changes.

Then whenever the current mesh is an acceptable mesh according an user-defined external criterion (decision box 1850 leading to box 2000) the mesh generation process finishes. Otherwise, the integrated mesh generation method follows to decision box 1860 where the quality of the mesh is checked. In the case that the mesh is an acceptable quality mesh, the method proceeds again to the refinement and/or derefinement and/or modification of the mesh (box 1840) and so on. Otherwise decision box 1860 leads to box 1870 and proceeds to the recalculation of the Delaunay mesh of the current vertices followed by the use of the mesh improvement method of this invention before going again to box 1840.

Finally, FIG. 26 is a high-level flow diagram describing the local actualization of the mesh data structure when some vertex coordinates have been modified (geometry changes and/or vertex changes). In such a case, the relative position of some vertices have changed, modifying some element shapes and the longest-edge relation between these elements. The actualization method essentially comprises the steps of: (1) Input of the set S of changed vertices (whose coordinates have changed) and their corresponding new coordinates (box 1900); then according to box 1920, (2) Finding the set SV of neighbor vertices in mesh, non contained in S, and connected at least with one vertex of S; (3) Adding to the set S the vertices of SV; (4) Finding set S-EDG of the edges of mesh including at least one vertex of S; (5) Finding set S-EL of elements of mesh including at least one vertex of S; Then according to box 1940 (6) Proceeding to construct the (restricted) longest-edge mesh data structure, associated with the submesh (not necessarily connected) defined by the sets S, S-EDG and S-EL by using the procedure of FIG. 18; (7) Then actualizing the global mesh data structure according the data of the restricted data structure associated with said submesh and setting VE-IND=0 for the vertices of S; (8) Erasing from GENE-DGE representation those generator edges having at least one vertex in SV and setting VE-IND=0 for the vertices of said generator edges; (9) Actualizing the associated VE-IND values for the neighbor vertices whose VE-IND values changed throughout steps 7 and 8.

It should be pointed out that, even when every component of this invention takes full advantage of the terminal-edge abstraction of a mesh of elements and its geometrical properties, and all these components can be adequately integrated to produce a flexible and automatic mesh generation system, the improvement component, the refinement component and the refinement/derefinement component can stand alone independent of each other in the sense that these components can be used separately in different applications. The derefinement method however only can be used to derefine meshes produced throughout the previous use of the longest-edge refinement method, and in this sense includes and generalizes the refinement method.

It should be understood that the foregoing description is only illustrative of the invention and its applications. Various alternatives and modifications can be devised by those skilled in the art without departing from the invention. In addition, this disclosure and its associated claims is intended to embrace the restriction and/or generalization of the point placement/elimination method and apparatus therefor for plane and surface triangulations with application to the automatic triangulation of non-convex plane geometries, to the automatic surface triangulation of 3-dimensional objects, and to surface triangulation as needed in terrain models or in computer graphics applications. This disclosure and its associated claims is intended to embrace the management of sequences of nested meshes as needed in multigrids applications (for a reference see Rivara model (1986)). In addition, this disclosure and its associated claims is intended to embrace the management of quasi-Delaunay meshes. This disclosure and its associated claims is intended to embrace the generalization of the method of this invention, mesh data structure, and apparatus therefor for (1) the distributed refinement/derefinement/improvement of the mesh using a distributed longest-edge mesh data structure; (2) for general meshes composed of submeshes which are either Delaunay submeshes and/or longest-edge nested (non-Delaunay) meshes obtained by the longest-edge refinement/derefinement method of this invention. This invention is also intended to embrace the generalization of the point placement method and apparatus therefor to N-dimensions, with N-greater than 3, useful, for example, in the area of "range searching," an area with extensive practical applications, for example, in data bases. Accordingly, the present invention is intended to embrace all such alternatives, modifications, variances, restrictions and generalizations which fall within the scope of the appended claims.

The present invention improves and generalizes the methods described by Rivara ((1984(a), 1984(b), 1986, 1996 and 1997), by Rivara et al. (1992) and by Rivara el al. (1997), allowing the management of Delaunay and non-Delaunay meshes; and improves and generalizes the derefinement method described by Rivara (1989).

This invention improves methods taught by the prior art, and provides useful benefit, in at least the following ways:

The improvement of a mesh having bad-shaped elements is simply and naturally performed by selecting points which improve the quality of the local point distribution around the bad-shaped elements, and then inserting those points by using the Delaunay teaching or variations of the Delaunay teaching. To search these points only the distribution of increasing neighbor elements is considered, not the Delaunay property of the mesh. The searching method does not modify the shared mesh data structure.

The method of this invention naturally eliminates undesirable slivers without using especial techniques to treat them.

Since the point searching method does not depend on the Delaunay property of the mesh, the present invention performs well over Delaunay and non-Delaunay meshes. Consequently, the method of the present invention optionally considers the pure refinement/derefinement of quality meshes, as needed in adaptive and/or multigrid finite-element analysis applications (a discussion can be found in Rivara (1986)). A simple point insertion method, that only uses longest-edge refinement of sets of elements, all of which have the longest-edge in common (terminal-edge), is used in this case.

The critical searching method of the present invention comprises repeatedly traversing successive neighbor elements over the mesh, starting with an active target element, until a set of terminal edges is identified in the mesh, wherein the midpoints of those terminal edges are the prospective points to be inserted in the mesh. The apparatus of the present invention takes advantages of the inherent properties of the searching method by using a simple efficient parallel computer capable of performing the parallel search without modifying the mesh and producing the following results: (1) the increase of the set of neighbor elements over which the parallel search has to be continued and (2) the identification of a set of terminal edges.

The method and apparatus of this invention allows the parallel refinement/derefinement of the mesh by locally modifying sets of neighbor elements sharing the common longest-edge, without producing intermediate non-valid meshes, and requiring no interprocessor communication.

The method and apparatus of this invention make use of an improved mesh data structure supporting the integrated improvement/refinement/derefinement of the mesh.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A method for refining both a vertex distribution and a mesh of elements for an object to be analyzed, each said element of said mesh having a plurality of vertices and edges, a body of said object comprising boundaries and interfaces, and said elements of said mesh including boundary elements defined as those mesh elements which intersect at least one of said boundaries, using a computerized device, comprising the steps of:

a) producing a mesh of elements for said object, identifying a set of target elements among said elements of said mesh using predetermined target element identification criteria, and identifying a subset of said set of target elements using predetermined target element subset identification criteria;

c) for each said element in said subset of target elements, searching for a set of terminal-edges using a longest edge. searching method, and inserting at least one selected point associated with at least one of said terminal-edges into said mesh producing a refined mesh, wherein each said terminal-edge is defined as a common longest-edge of each said mesh element sharing said terminal-edge;

e) repeating said step c) for succeeding subsets of actualized sets of said target elements until a predetermined stopping criterion is achieved; and displaying information related to said mesh.

2. The method of claim 1, for also improving in addition to refining said vertex distribution and said mesh of elements, comprising the step, between said steps a) and c), of:

b) selecting a set of boundary points of said boundary elements included within said subset of target elements using a longest-edge boundary selection method, inserting said selected boundary points into said mesh, and actualizing said subset of said target elements of said mesh; and said step c) further comprising:

selecting said at least one selected point using a terminal edge selection method and inserting said at least one selected point in said mesh; and said step e) further comprising:

repeating said step b) in addition to said step c) for succeeding subsets of actualized sets of said target elements until a predetermined stopping criterion is achieved.

3. The method of claim 2, said boundary elements defined as elements of said mesh which meet at least one of the criteria of: having at least one vertex over said object boundaries; intersecting said object boundary; and intersecting said object interface; wherein said longest-edge boundary selection method of step b), for each boundary element in said subset of target elements, comprises the further steps of:

b1) finding a longest-edge of said boundary element and a midpoint MPT of said longest-edge of said boundary element;

b2) skipping the boundary process of step b4) if said midpoint MPT is a boundary point;

b3) skipping the boundary process of step b4) if the maximum length of the edges of said boundary element is greater than a fraction ALPHA1 of the minimum length of the interior edges of said boundary element whenever said maximum length exists, wherein ALPHA1 is a parameter greater than zero;

b4) otherwise, identifying a selected point as one of said boundary points improving the boundary point distribution near to an auxiliary boundary point and inserting said selected point into said mesh, said auxiliary boundary point selected from the group consisting of the midpoint of the largest boundary edge of said element and the projection of said MPT over said boundary.

4. The method of claim 1, wherein said longest edge searching method of said step c) comprises the further steps of:

c1) establishing an initially empty set of terminal edges, an initially empty processed submesh, and an initially empty set of processing elements, and adding said element to said set of processing elements as a processing element thereof;

c2) picking a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty.

5. The method of claim 2, wherein said longest edge searching method of said step c) comprises the further steps of:

c1) establishing an initially empty set of terminal edges, an initially empty processed submesh, and an initially empty set of processing elements, and adding said element to said set of processing elements as a processing element thereof;

c2) picking a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty.

6. The method of claim 4, wherein said step c2) comprises the further steps of:

c2a) finding a selected edge which is a longest-edge between the edges of said processing element;

c2b) finding a set of active elements defined as those elements in mesh not present in said processed submesh having said selected edge as an edge and whose respective longest-edge is greater than said selected edge, and adding each element in said set of active elements to said set of processing elements;

c2c) if said set of active elements is empty, adding said selected edge to said set of terminal edges.

7. The method of claim 5, wherein said step c2) comprises the further steps of:

c2a) finding a selected edge which is a longest-edge between the edges of said processing element;

c2b) finding a set of active elements defined as those elements in mesh not present in said processed submesh having said selected edge as an edge and whose respective longest-edge is greater than said selected edge, and adding each element in said set of active elements to said set of processing elements;

c2c) if said set of active elements is empty, adding said selected edge to said set of terminal edges.

8. The method of claim 2, wherein said terminal edge selection method of said step c) comprises the further steps of:

c4) identifying a prospective point as a midpoint of a greatest edge between the edges of elements within said set of terminal-edges;

c5) choosing said prospective point to be one of said selected points to be inserted into said mesh, said selected point in said object interior, thereby producing said improved mesh, if the distance from said prospective point to said object boundary is greater than a fraction K of the length of said greatest edge, wherein K is a parameter greater than zero;

c6) otherwise choosing one of said selected points to be inserted into said mesh as a boundary point improving the boundary point distribution near to an auxiliary boundary point, wherein auxiliary boundary point is equal to said prospective point when said prospective point is over the boundary, and wherein said auxiliary boundary point is otherwise equal to the projection of said prospective point over the boundary.

9. The method of claim 1, said step c) further comprising the steps of:

selecting midpoints of said associated terminal-edges as said selected points; and inserting said selected points into said mesh by performing longest-edge bisection of each element in said mesh sharing said associated terminal-edge.

10. The method of claim 1, for use when said computerized device comprises at least one parallel processor, said step c) comprising the further step of:

for each said element in said subset of target elements, also searching for an associated set of terminal-element-sets for said mesh; and said method of claim 1 further comprising the further step, between said steps c) and e), of:

d) producing a refined mesh by successive parallel refinement of a subset of said set of terminal-element-sets, said subset of said set of terminal-element-sets containing completely disjoint terminal-element-sets, and refining each said terminal-element-set by:

d1) partitioning each element in said terminal-element-set by a midpoint of a common longest-edge, said common longest-edge being equal to said associated terminal-edge; and d2) locally actualizing said mesh data structure; and said step e) further comprising:

repeating said step d) in addition to said step c) for succeeding subsets of actualized sets of said target elements until a predetermined stopping criterion is achieved.

11. The method of claim 2, for use when said computerized device comprises at least one parallel processor, wherein said longest edge searching method of step c), comprises the further steps, using said at least one parallel processor, of performing parallel searching by:

c1) establishing an initially empty set of terminal edges, an initially empty processed submesh, and an initially empty set of processing elements, and adding said element to said set of processing elements as a processing element thereof;

c2) picking and assigning to each free one of said at least one parallel processors, a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty; and said step e) further comprising:

repeating said step c) for succeeding subsets of actualized sets of said target elements until a predetermined stopping criterion is achieved.

12. The method of claim 10, wherein said longest edge searching method of step c), comprises the further steps, using said at least one parallel processor, of performing parallel searching by:

c1) establishing an initially empty set of terminal edges, an initially empty processed submesh, and an initially empty set of processing elements, and adding said element to said set of processing elements as a processing element thereof;

c2) picking and assigning to each free one of said at least one parallel processors, a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty.

13. The method of claim 12, wherein said step c2) comprises the further steps of:

c2a) finding a selected edge which is a longest-edge between the edges of said processing element;

c2b) finding a set of active elements defined as those elements in mesh not present in said processed submesh having said selected edge as an edge and whose respective longest-edge is greater than said selected edge, and adding each element in said set of active elements to said set of processing elements;

c2c) if said set of active elements is empty, adding said selected edge to said set of terminal edges.

14. The method of claim 1, for also derefining in addition to refining said vertex distribution and said mesh of elements, comprising the further steps, for an initial mesh previously obtained by at least said steps a), c) and e), of:

f) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

g) producing at least one target vertex to be derefined in said mesh, and for each said target vertex:

g1) producing a set of active nodes, each said active node comprising a vertex, an associated vertex indicator and an associated generator-edge;

g2) ordering the nodes of said set of active nodes in decreasing order of said vertex indicator values, and for nodes having equal vertex indicator value, in increasing order of the lengths of said associated generator-edges;

g3) derefining a set of active vertices associated with said set of active nodes, according to said ordering of said associated active nodes, said vertices of said active nodes being directly connected with the vertices of said associated generator edges, and locally actualizing said target vertices; and h) repeating said steps g) for actualized target vertices until an user-defined stopping criterion is achieved.

15. The method of claim 2, for also derefining in addition to refining and improving said vertex distribution and said mesh of elements, comprising the further steps, for an initial mesh previously obtained by at least said steps a), b), c) and e), of:

f) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

g) producing at least one target vertex to be derefined in said mesh, and for each said target vertex:

g1) producing a set of active nodes, each said active node comprising a vertex, an associated vertex indicator and an associated generator-edge;

g2) ordering the nodes of said set of active nodes in decreasing order of said vertex indicator values, and for nodes having equal vertex indicator value, in increasing order of the lengths of said associated generator-edges;

g3) derefining a set of active vertices associated with said set of active nodes according to said ordering of said associated active nodes, said vertices of said active nodes being directly connected with the vertices of said associated generator edges, and locally actualizing said target vertices; and h) repeating said steps g) for actualized target vertices until an user-defined stopping criterion is achieved.

16. The method of claim 11, for also derefining in addition to refining and improving said vertex distribution and said mesh of elements, comprising the further steps, for an initial mesh previously obtained by at least said steps a), b), c), d) and e), of:

f) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

g) producing at least one target vertex to be derefined in said mesh, and for each said target vertex:

g1) producing a set of active nodes, each said active node comprising a vertex, an associated vertex indicator and an associated generator-edge;

g2) ordering the nodes of said set of active nodes in decreasing order of said vertex indicator values, and for nodes having equal vertex indicator value, in increasing order of the lengths of said associated generator-edges;

g3) derefining in parallel, a plurality of said active vertices within said set of active vertices, for active vertices having completely disjoint sets of neighbor elements, according to said ordering of said associated active nodes, said vertices of said active nodes being directly connected with the vertices of said associated generator edges, and locally actualizing said target vertices; and h) repeating said steps g) for actualized target vertices until an user-defined stopping criterion is achieved.

17. A method for derefining an initial mesh of elements for an object to be analyzed, each said element of said initial mesh having a plurality of vertices and edges, a body of said object comprising boundaries and interfaces, and said elements of said initial mesh including boundary elements defined as those mesh elements which intersect at least one of said boundaries, wherein said initial mesh was previously obtained by at least the steps of: i) producing a mesh of elements for said object, identifying a set of target elements among said elements of said mesh using predetermined target element identification criteria, and identifying a subset of said set of target elements using predetermined target element subset identification criteria; ii) for each said element in said subset of target elements, searching for a set of terminal-edges using a longest edge searching method, and inserting at least one selected point associated with at least one of said terminal-edges into said mesh producing a refined mesh, wherein each said terminal-edge is defined as a common longest-edge of each said mesh element sharing said terminal-edge; and iii) repeating said step ii) for succeeding subsets of actualized sets of said target elements until a predetermined stopping criterion is achieved; using a computerized device, comprising the steps of:

a) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

b) producing at least one target vertex to be derefined in said mesh, and for each said target vertex:

b1) producing a set of active nodes, each said active node comprising a vertex, an associated vertex indicator and an associated generator-edge;

b2) ordering the nodes of said set of active nodes in decreasing order of said vertex indicator values, and for nodes having equal vertex indicator value, in increasing order of the lengths of said associated generator-edges;

b3) derefining a set of active vertices associated with said set of active nodes, according to said ordering of said associated active nodes, said vertices of said active nodes being directly connected with the vertices of said associated generator edges, and locally actualizing said target vertices;

c) repeating said steps b) for actualized target vertices until an user-defined stopping criterion is achieved an displaying information related to said mesh.

18. The method of claim 17, for use when said computerized device comprises at least one parallel processor, said step b3) comprising the further step of:

b3.1) derefining in parallel, a plurality of said active vertices within said set of said active vertices, for active vertices having completely disjoint sets of neighbor elements.

19. The method of claim 17, wherein said step b1) comprises the further steps of:
   b1.1) initializing said set of active nodes with a triplet (VX, NX, GX) wherein VX is said vertex, NX is said associated vertex indicator and GX is said associated generator edge;
   b1.2) initializing a set of processing nodes with said triplet (VX, NX, GX);
   b1.3) picking a node (VY, NY, GY) from said set of processing nodes and selecting a set of neighbor nodes, wherein each node (VZ, NZ, GZ) of vertex VZ, associated vertex indicator NZ, and associated generator edge GZ, are all added to said set of neighbor nodes whenever at least one condition is met selected from the group of conditions consisting of:
      the edge of vertices VZ, VY exists in the mesh and NZ >NY; and
      the edge of vertices VZ, VY exists in the mesh, and NZ =NY, and GZ<GY;
   b1.4) adding each selected neighbor node to said set of processing nodes and adding each selected neighbor node to said set of active nodes;
   b1.5) repeating said steps b1.3) and b1.4) until said set of processing nodes is empty and said set of active nodes in completed.

20. The method of claim 18, wherein said step b1) comprises the further steps of:
   b.1) initializing said set of active nodes with a triplet (VX, NX, GX) wherein VX is said vertex, NX is said associated vertex indicator and GX is said associated generator edge;
   b1.2) initializing a set of processing nodes with said triplet (VX, NX, GX);
   b1.3) picking a node (VY, NY, GY) from said set of processing nodes and selecting a set of neighbor nodes, wherein each node (VZ, NZ, GZ) of vertex VZ, associated vertex indicator NZ, and associated generator edge GZ, are all added to said set of neighbor nodes whenever at least one condition is met selected from the group of conditions consisting of:
      the edge of vertices VZ, VY exists in the mesh and NZ >NY; and
      the edge of vertices VZ, VY exists in the mesh, and NZ=NY, and GZ<GY;
   b1.4) adding each selected neighbor node to said set of processing nodes and adding each selected neighbor node to said set of active nodes;
   b1.5) repeating said steps b1.3) and b1.4) until said set of processing nodes is empty and said set of active nodes in completed.

21. The method of claim 17, wherein said step b3), for each active vertex in said set of active vertices, further comprises the steps of:
   b3.1) eliminating from said mesh: said active vertex, each edge containing said active vertex, and each of said mesh elements containing said active vertex; and
   b3.2) adding to said mesh: a new edge equal to the generator-edge of said vertex, and new elements comprising each element sharing said edge.

22. The method of claim 18, wherein said step b3), for each active vertex in said set of active vertices, further comprises the steps of:
   b3.1) eliminating from said mesh: said active vertex, each edge containing said active vertex, and each of said mesh elements containing said active vertex; and
   b3.2) adding to said mesh: a new edge equal to the generator-edge of said vertex, and new elements comprising each element sharing said edge.

23. A method for representing a data structure for refining both a vertex distribution and a mesh of elements for an object to be analyzed, each said element of said mesh having a plurality of vertices and edges, a body of said object comprising boundaries and interfaces, and said elements of said mesh including boundary elements defined as those mesh elements which intersect at least one of said boundaries, wherein said mesh is refined by at least the steps of: i) producing a mesh of elements for said object, identifying a set of target elements among said elements of said mesh using predetermined target element identification criteria, and identifying a subset of said set of target elements using predetermined target element subset identification criteria; ii) for each said element in said subset of target elements, searching for a set of terminal-edges using a longest edge searching method, and inserting at least one selected point associated with at least one of said terminal-edges into said mesh producing a refined mesh, wherein each said terminal-edge is defined as a common longest-edge of each said mesh element sharing said terminal-edge; and iii) repeating said step ii) for succeeding subsets of actualized sets of said target elements until a predetermined stopping criterion is achieved; said data structure representing a longest-edge relation existing between neighbor elements in said mesh of elements useful for searching sets of terminal edges in mesh wherein each terminal-edge is defined as a common longest-edge of each said mesh element sharing said terminal-edge, said data structure further comprising edge, element and vertex representations, and each said element of said mesh having a plurality of vertices and edges, using a computerized device, wherein:
   a) said edge representation, for each represented edge which is an edge of said mesh, comprises:
      a1) pointers to the two vertices of said edge in said vertex representation;
      a2) a set of pointers to neighbor elements in said element representation, each said neighbor element having said represented edge as one of its edges, and having a longest-edge greater than said represented edge;
   b) said element representation, for each said each element, comprises:
      b1) a pointer to a longest-edge of said element in said edge representation; and information related to said mesh is displayed.

24. The method of claim 23, comprising the further steps of:
   initializing said data structure for an initial mesh by creating said edge, vertex, and element representations;
   using said data structure for searching sets of said terminal-edges in mesh associated with target elements being refined in mesh; and
   actualizing said data structure after insertion of each selected point selected as a midpoint of one of said terminal-edges in mesh.

25. The method of claim 23, also used for derefining said vertex distribution and said mesh of elements for said object to be analyzed, said data structure further representing a relation of precedence existing between neighbor vertices of said mesh, said data structure further comprising a generator-edge representation, and said mesh previously having been refined using said computerized device wherein, further:

c) said vertex representation, for each said vertex of said mesh, comprises:

c1) an integer indicator said indicator being equal to zero if said vertex was not obtained as a midpoint of a terminal-edge in a previous mesh) otherwise, said indicator being equal to the successor of the maximum value between the indicator values of two vertices V1 and V2, said vertices V1 and V2 defining a terminal edge in a previous mesh, said terminal-edge defined as the generator-edge of said vertex;

c2) a pointer to said generator edge for said vertex in the generator-edge representation; and d) said generator-edge representation, for each generator-edge thereof, comprises:

d1) pointers to two vertices defining said generator-edge in said vertex representation.

26. The method of claim 25, comprising the further steps of:

initializing said data structure for an initial mesh by creating said edge, vertex, element and generator-edge representations; and using said data structure for performing mesh derefinement based on terminal edge derefinement;

actualize said data structure after mesh derefinement.

27. A computerized device for refining both a vertex distribution and a mesh of elements for an object to be analyzed, each said element of said mesh having a plurality of vertices and edges, a body of said object comprising boundaries and interfaces, and said elements of said mesh including boundary elements defined as those mesh elements which intersect at least one of said boundaries, comprising processing, input, output, and storage devices providing means for:

a) producing a mesh of elements for said object, identifying a set of target elements among said elements of said mesh using predetermined target element identification criteria, and identifying a subset of said set of target elements using predetermined target element subset identification criteria;

c) for each said element in said subset of target elements, searching for a set of terminal-edges using a longest edge searching method, and inserting at least one selected point associated with at least one of said terminal-edges into said mesh producing a refined mesh, wherein each said terminal-edge is defined as a common longest-edge of each said mesh element sharing said terminal-edge;

e) repeating said step c) for succeeding subsets of actualized sets of said target elements until a predetermined stopping criterion is achieved;

displaying information related to said mesh.

28. The computerized device of claim 27, for also improving in addition to refining said vertex distribution and said mesh of elements, said processing, input, output, and storage devices further comprising means, between said steps a) and c), for:

b) selecting a set of boundary points of said boundary elements included within said subset of target elements using a longest-edge boundary selection method, inserting said selected boundary points into said mesh, and actualizing said subset of said target elements of said mesh, and and as part of said step c), (or:

selecting said at least one selected point using a terminal edge selection method and inserting said at least one selected point in said mesh; and and as part of said step e), for:

repeating said step b) in addition to said step c) for succeeding subsets of actualized sets of said target elements until a predetermined stopping criterion is achieved.

29. The computerized device of claim 28; said boundary elements defined as elements of said mesh which meet at least one of the criteria of: having at least one vertex over said object boundaries; intersecting said object boundary; and intersecting said object interface; said processing, input, output, and storage devices further comprising means, as part of said longest-edge boundary selection method of step b), for each boundary element in said subset of target elements, for:

b1) finding a longest-edge of said boundary element and a midpoint MPT of said longest-edge of said boundary element;

b2) skipping the boundary process of step b4) if said midpoint MPT is a boundary point; b3) skipping the boundary process of step b4). if the maximum length of the edges of said boundary element is greater than a fraction ALPHA1 of the minimum length of the interior edges of said boundary element whenever said maximum length exists, wherein ALPHA1 is a parameter greater than zero;

b4) otherwise, identifying a selected point as one of said boundary points improving the boundary point distribution near to an auxiliary boundary point and inserting said selected point into said mesh, said auxiliary boundary point selected from the group consisting of the midpoint of the largest boundary edge of said element and the projection of said MPT over said boundary.

30. The computerized device of claim 27, said processing, input, output, and storage devices further comprising means, as part of said longest edge searching method of said step c), for:

c1) establishing an initially empty set of terminal edges, an initially empty processed submesh, and an initially empty set of processing elements, and adding said element to said set of processing elements as a processing element thereof;

c2) picking a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty.

31. The computerized device of claim 28, said processing, input, output, and storage devices further comprising means, as part of said longest edge searching method of said step c), for:

c1) establishing an initially empty set of terminal edges, an initially empty processed submesh, and an initially empty set of processing elements, and adding said element to said set of processing elements as a processing element thereof;

c2) picking a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty.

32. The computerized device of claim 30, said processing, input, output, and storage devices further comprising means, as part of said step c2), for:

c2a) finding a selected edge which is a longest-edge between the edges of said processing element;

c2b) finding a set of active elements defined as those elements in mesh not present in said processed submesh having said selected edge as an edge and whose respective longest-edge is greater than said selected edge, and adding each element in said set of active elements to said set of processing elements;

c2c) if said set of active elements is empty, adding said selected edge to said set of terminal edges.

33. The computerized device of claim 31, said processing, input, output, and storage devices further comprising means, as part of said step c2), for:

c2a) finding a selected edge which is a longest-edge between the edges of said processing element;

c2b) finding a set of active elements defined as those elements in mesh not present in said processed submesh having said selected edge as an edge and whose respective longest-edge is greater than said selected edge, and adding each element in said set of active elements to said set of processing elements;

c2c) if said set of active elements is empty, adding said selected edge to said set of terminal edges.

34. The computerized device of claim 28, said processing, input, output, and storage devices further comprising means, as part of said terminal edge selection method of said step c), for:

c4) identifying a prospective point as a midpoint of a greatest edge between the edges of elements within said set of terminal-edges;

c5) choosing said prospective point to be one of said selected points to be inserted into said mesh, said selected point in said object interior, thereby producing said improved mesh, if the distance from said prospective point to said object boundary is greater than a fraction K of the length of said greatest edge, wherein K is a parameter greater than zero;

c6) otherwise choosing one of said selected points to be inserted into said mesh as a boundary point improving the boundary point distribution near to an auxiliary boundary point, wherein auxiliary boundary point is equal to said prospective point when said prospective point is over the boundary, and wherein said auxiliary boundary point is otherwise equal to the projection of said prospective point over the boundary.

35. The computerized device of claim 27, said processing, input, output, and storage devices further comprising means, as part of said step c), for:

selecting midpoints of said associated terminal-edges as said selected points; and inserting said selected points into said mesh by performing longest-edge bisection of each element in said mesh sharing said associated terminal-edge.

36. The computerized device of claim 27, said processing device thereof comprising at least one parallel processor, said processing, input, output, and storage devices further comprising means, as part of said step c), for:

for each said element in said subset of target elements, also searching for an associated set of terminal-element-sets for said mesh; and between said steps c) and e), for:

d) producing a refined mesh by successive parallel refinement of a subset of said set of terminal-element-sets, said subset of said set of terminal-element-sets containing completely disjoint terminal-element-sets, and refining each said terminal-element-set by:

d1) partitioning each element in said terminal-element-set by a midpoint of a common longest-edge, said common longest-edge being equal to said associated terminal-edge; and d2) locally actualizing said mesh data structure; and as part of said step e), for:

repeating said step d) in addition to said step c) for succeeding subsets of actualized sets of said target elements until a predetermined stopping criterion is achieved.

37. The computerized device of claim 28, said processing device thereof comprising at least one parallel processor, said processing, input, output, and storage devices further comprising means, as part of said longest edge selection method of said step c), for performing parallel searching by:

c1) establishing an initially empty set of terminal edges, an initially empty processed submesh, and an initially empty set of processing elements, and adding said element to said set of processing elements as a processing element thereof;

c2) picking and assigning to each free one of said at least one parallel processors, a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty; and as part of said step e), for:

repeating said step c) for succeeding subsets of actualized sets of said target elements until a predetermined stopping criterion is achieved.

38. The computerized device of claim 36, said processing, input, output, and storage devices further comprising means, as part of said longest edge selection method of said step c), for performing parallel searching by:

c1) establishing an initially empty set of terminal edges, an initially empty processed submesh, and an initially empty set of processing elements, and adding said element to said set of processing elements as a processing element thereof;

c2) picking and assigning to each free one of said at least one parallel processors, a processing element from said set of processing elements, adding said processing element to said processed submesh, producing an increased set selected from the group consisting of said set of processing elements, and said set of terminal edges, and eliminating said processing element from said set of processing elements; and c3) repeating said step c2) for each element in said set of processing elements until said set of processing elements is empty.

39. The computerized device of claim 38, said processing, input, output, and storage devices further comprising means, as part of said longest edge selection method of said step c2), for:

c2a) finding a selected edge which is a longest-edge between the edges of said processing element;

c2b) finding a set of active elements defined as those elements in mesh not present in said processed sub-mesh having said selected edge as an edge and whose respective longest-edge is greater than said selected edge, and adding each element in said set of active elements to said set of processing elements;

c2c) if said set of active elements is empty, adding said selected edge to said set of terminal edges.

40. The computerized device of claim 27, for also derefining in addition to refining said vertex distribution and said mesh of elements, said processing, input, output, and storage devices further comprising means, for an initial mesh previously obtained by at least said steps a), c) and e), for:

f) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

g) producing at least one target vertex to be derefined in said mesh, and for each said target vertex:

g1) producing a set of active nodes, each said active node comprising a vertex, an associated vertex indicator and an associated generator-edge;

g2) ordering the nodes of said set of active nodes in decreasing order of said vertex indicator values, and for nodes having equal vertex indicator value, in increasing order of the lengths of said associated generator-edges;

g3) derefining a set of active vertices associated with said set of active nodes, according to said ordering of said associated active nodes, said vertices of said active nodes being directly connected with the vertices of said associated generator edges, and locally actualizing said target vertices; and h) repeating said steps g) for actualized target vertices until an user-defined stopping criterion is achieved.

41. The computerized device of claim 28, for also derefining in addition to refining and improving said vertex distribution and said mesh of elements, said processing, input, output, and storage devices further comprising means, for an initial mesh previously obtained by at least said steps a), b), c) and e), for:

f) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

g) producing at least one target vertex to be derefined in said mesh, and for each said target vertex:

g1) producing a set of active nodes, each said active node comprising a vertex, an associated vertex indicator and an associated generator-edge;

g2) ordering the nodes of said set of active nodes in decreasing order of said vertex indicator values, and for nodes having equal vertex indicator value, in increasing order of the lengths of said associated generator-edges;

g3) derefining a set of active vertices associated with said set of active nodes, according to said ordering of said associated active nodes, said vertices of said active nodes being directly connected with the vertices of said associated generator edges, and locally actualizing said target vertices; and h) repeating said steps g) for actualized target vertices until an user-defined stopping criterion is achieved.

42. The computerized device of claim 37, for also derefining in addition to refining and improving said vertex distribution and said mesh of elements, said processing, input, output, and storage devices further comprising means, for an initial mesh previously obtained by at least said steps a), b), c), d) and e), for:

f) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

g) producing at least one target vertex to be derefined in said mesh, and for each said target vertex:

g1) producing a set of active nodes, each said active node comprising a vertex, an associated vertex indicator and an associated generator-edge;

g2) ordering-the nodes of said set of active nodes in decreasing order of said vertex indicator values, and for nodes having equal vertex indicator value, in increasing order of the lengths of said associated generator-edges;

g3) derefining in parallel, a plurality of said active vertices within said set of active vertices, for active vertices having completely disjoint sets of neighbor elements, according to said ordering of said associated active nodes, said vertices of said active nodes being directly connected with the vertices of said associated generator edges, and locally actualizing said target vertices; and h) repeating said steps g) for actualized target vertices until an user-defined stopping criterion is achieved.

43. A computerized device for derefining an initial mesh of elements for an object to be analyzed, each said element of said initial mesh having a plurality of vertices and edges, a body of said object comprising boundaries and interfaces, and said elements of said initial mesh including boundary elements defined as those mesh elements which intersect at least one of said boundaries, wherein said initial mesh was previously obtained by at least the steps of: i) producing a mesh of elements for said object, identifying a set of target elements among said elements of said mesh using predetermined target element identification criteria, and identifying a subset of said set of target elements using predetermined target element subset identification criteria; ii) for each said element in said subset of target elements, searching for a set of terminal-edges using a longest edge searching method, and inserting at least one selected point associated with at least one of said terminal-edges into said mesh producing a refined mesh, wherein each said terminal-edge is defined as a common longest-edge of each said mesh element sharing said terminal-edge; and iii) repeating said step ii) for succeeding subsets of actualized sets of said target elements until a predetermined stopping criterion is achieved; comprising processing, input, output, and storage devices providing means for:

a) associating with each vertex of said initial mesh, a vertex indicator equal to the successor of the maximum between the indicator values of two vertices V1 and V2 if said two vertices defined a terminal-edge in a precedent mesh preceding said initial mesh and if said vertex was obtained in said previous mesh as a midpoint of said terminal-edge defining an associated generator-edge for said vertex, otherwise said vertex indicator equal to zero;

b) producing at least one target vertex to be derefined in said mesh, and for each said target vertex:

b1) producing a set of active nodes, each said active node comprising a vertex, an associated vertex indicator and an associated generator-edge;

b2) ordering the nodes of said set of active nodes in decreasing order of said vertex indicator values, and for nodes having equal vertex indicator value, in increasing order of the lengths of said associated generator-edges;

b3) derefining a set of active vertices associated with said set of active nodes, according to said ordering of said associated active nodes, said vertices of said active nodes being directly connected with the vertices of said associated generator edges, and locally actualizing said target vertices;

c) repeating said steps b) for actualized target vertices until an user-defined stopping criterion is achieved; and displaying information related to said mesh.

44. The computerized device of claim 43, said processing device thereof comprising at least one parallel processor, said processing, input, output, and storage devices further comprising means, as part of said step b3), for:

b3.1) derefining in parallel, a plurality of said active vertices within said set of said active vertices, for active vertices having completely disjoint sets of neighbor elements.

45. The computerized device of claim 43, said processing, input, output, and storage devices further comprising means, as part of said step b1), for:

b1.1) initializing said set of active nodes with a triplet (VX, NX, GX) wherein VX is said vertex, NX is said associated vertex indicator and GX is said associated generator edge;

b1.2) initializing a set of processing nodes with said triplet (VX, NX, GX);

b1.3) picking a node (VY, NY, GY) from said set of processing nodes and selecting a set of neighbor nodes, wherein each node (VZ, NZ, GZ) of vertex VZ, associated vertex indicator NZ, and associated generator edge GZ, are all added to said set of neighbor nodes whenever at least one condition is met selected from the group of conditions consisting of:

the edge of vertices VZ, VY exists in the mesh and NZ>NY; and the edge of vertices VZ, VY exists in the mesh, and NZ NY, and GZ<GY;

b1.4) adding each selected neighbor node to said set of processing nodes and adding each selected neighbor node to said set of active nodes;

b1.5) repeating said steps b.1.3) and b.1.4) until said set of processing nodes is empty and said set of active nodes in completed.

46. The computerized device of claim 44, said processing, input, output, and storage devices further comprising means, as part of said step b1), for:

b1.1) initializing said set of active nodes with a triplet (VX, NX, GX) wherein VX is said vertex, NX is said associated vertex indicator and GX is said associated generator edge;

b1.2) initializing a set of processing nodes with said triplet (VX, NX, GX);

b1.3) picking a node (VY, NY, GY) from said set of processing nodes and selecting a set of neighbor nodes, wherein each node (VZ, NZ, GZ) of vertex VZ, associated vertex indicator NZ, and associated generator edge GZ, are all added to said set of neighbor nodes whenever at least one condition is met selected from the group of conditions consisting of:

the edge of vertices VZ, VY exists in the mesh and NZ>NY; and the edge of vertices VZ, VY exists in the mesh, and NZ=NY, and GZ<GY;

b1.4) adding each selected neighbor node to said set of processing nodes and adding each selected neighbor node to said set of active nodes;

b1.5) repeating said steps b.1.3) and b.1.4) until said set of processing nodes is empty and said set of active nodes in completed.

47. The computerized device of claim 43, said processing, input, output, and storage devices further comprising means, as part of said step b3), for each active vertex in said set of active vertices, for:

b3.1) eliminating from said mesh: said active vertex, each edge containing said active vertex, and each of said mesh elements containing said active vertex; and b3.2) adding to said mesh: a new edge equal to the generator-edge of said vertex, and new elements comprising each element sharing said edge.

48. The computerized device of claim 43, said processing, input, output, and storage devices further comprising means, as part of said step b3), for each active vertex in said set of active vertices, for:

b3.1) eliminating from said mesh: said active vertex, each edge containing said active vertex, and each of said mesh elements containing said active vertex; and b3.2) adding to said mesh: a new edge equal to the generator-edge of said vertex, and new elements comprising each element sharing said edge.

49. A data structure stored and processed by a computerized device for refining both a vertex distribution and a mesh of elements for an object to be analyzed, each said element of said mesh having a plurality of vertices and edges, a body of said object comprising boundaries and interfaces, and said elements of said mesh including boundary elements defined as those mesh elements which intersect at least one of said boundaries, wherein said mesh is refined by at least the steps of: i) producing a mesh of elements for said object, identifying a set of target elements among said elements of said mesh using predetermined target element identification criteria, and identifying a subset of said set of target elements using predetermined target element subset identification criteria; ii) for each said element in said subset of target elements, searching for a set of terminal-edges using a longest edge searching method, and inserting at least one selected point associated with at least one of said terminal-edges into said mesh producing a refined mesh, wherein each said terminal-edge is defined as a common longest-edge of each said mesh element sharing said terminal-edge; and iii) repeating said step ii) for succeeding subsets of actualized sets of said target elements until a predetermined stopping criterion is achieved; said data structure representing a longest-edge relation existing between neighbor elements in said mesh of elements useful for searching sets of terminal edges in mesh wherein each terminal-edge is defined as a common longest-edge of each said mesh element sharing said terminal-edge, said data structure further comprising edge, element and vertex representations, and each said element of said mesh having a plurality of vertices and edges, wherein:

- a) said edge representation, for each represented edge which is an edge of said mesh, comprises:
  - a1) pointers to the two vertices of said edge in said vertex representation;
  - a2) a set of pointers to neighbor elements in said element representation, each said neighbor element having said represented edge as one of its edges, and having a longest-edge greater than said represented edge;
- b) said element representation, for each said each element, comprises:
  - b1) a pointer to a longest-edge of said element in said edge representation:

information related to said mesh is displayed.

50. The data structure of claim 49, said computerized device further comprising means for:

initializing said data structure for an initial mesh by creating said edge, vertex, and element representations;

using said data structure for searching sets of said terminal-edges in mesh associated with target elements being refined in mesh; and actualizing said data structure after insertion of each selected point selected as a midpoint of one of said terminal-edges in mesh.

51. The data structure of claim 49, said computerized device also used for derefining said vertex distribution and said mesh of elements for said object to be analyzed, said data structure further representing a relation of precedence existing between neighbor vertices of said mesh, said data structure further comprising a generator-edge representation, and said mesh previously having been refined using said computerized device, wherein, further:

- c) said vertex representation, for each said vertex of said mesh, comprises:
  - c1) an integer indicator, said indicator being equal to zero if said vertex was not obtained as a midpoint of a terminal-edge in a previous mesh; otherwise, said indicator being equal to the successor of the maximum value between the indicator values of two vertices V1 and V2, said vertices V1 and V2 defining a terminal-edge in a previous mesh, said terminal-edge defined as the generator-edge of said vertex;
  - c2) a pointer to said generator edge for said vertex in the generator-edge representation; and
- d) said generator-edge representation, for each generator-edge thereof, comprises:
  - d1) pointers to two vertices defining said generator-edge in said vertex representation.

52. The data structure of claim 51, said computerized device further comprising means for:

initializing said data structure for an initial mesh by creating said edge, vertex, element and generator-edge representations; and using said data structure for performing mesh derefinement based on terminal-edge derefinement; actualize said data structure after mesh derefinement.

* * * * *